United States Patent
Olsen et al.

(10) Patent No.: US 8,413,926 B2
(45) Date of Patent: *Apr. 9, 2013

(54) AIRCRAFT AUXILIARY POWER UNIT SUSPENSION SYSTEM FOR ISOLATING AN AIRCRAFT AUXILIARY POWER UNIT

(75) Inventors: Kirk W. Olsen, Erie, PA (US); Gerald P. Whiteford, Waterford, PA (US); Pat Sheridan, North East, PA (US); Scott K. Thompson, Erie, PA (US)

(73) Assignee: Lord Corporation, Cary, NC (US)

( * ) Notice: Subject to any disclaimer, the term of this patent is extended or adjusted under 35 U.S.C. 154(b) by 38 days.

This patent is subject to a terminal disclaimer.

(21) Appl. No.: 12/971,156

(22) Filed: Dec. 17, 2010

(65) Prior Publication Data
US 2011/0084192 A1    Apr. 14, 2011

Related U.S. Application Data

(63) Continuation of application No. 11/397,208, filed on Apr. 4, 2006, now Pat. No. 7,878,448.

(60) Provisional application No. 60/668,030, filed on Apr. 4, 2005.

(51) Int. Cl.
*B64D 27/00* (2006.01)

(52) U.S. Cl.
USPC .......................................... 244/54; 248/557

(58) Field of Classification Search ............ 244/54, 244/58; 248/554, 555, 556, 557; 267/140.11
See application file for complete search history.

(56) References Cited

U.S. PATENT DOCUMENTS

| | | | |
|---|---|---|---|
| 1,901,860 A | 3/1933 | Austin | |
| 2,684,819 A | 7/1954 | Leggett et al. | |
| 2,720,370 A | 10/1955 | Hasbrouck | |
| 3,073,557 A | 1/1963 | Davis | |
| 3,727,862 A | 4/1973 | Kaufhold et al. | |
| 4,050,665 A | 9/1977 | Matthews et al. | |
| 4,514,458 A | 4/1985 | Thorn et al. | |
| 4,717,094 A | 1/1988 | Chee | |
| 4,852,848 A | 8/1989 | Kucera | |
| 5,491,892 A | 2/1996 | Fritz et al. | |
| 5,902,050 A | 5/1999 | Balczun et al. | |
| 6,065,742 A * | 5/2000 | Whiteford | 267/140.5 |
| 6,123,350 A | 9/2000 | Suzuki | |
| 6,129,177 A | 10/2000 | Gwinn | |
| 6,328,293 B1 | 12/2001 | Olsen | |
| 6,397,988 B1 | 6/2002 | Ptak | |
| 6,581,874 B2 | 6/2003 | Lemire et al. | |
| 2002/0084381 A1 | 7/2002 | Lemire et al. | |
| 2003/0010866 A1 | 1/2003 | Wilksch | |

\* cited by examiner

*Primary Examiner* — Tien Dinh
*Assistant Examiner* — Michael Kreiner
(74) *Attorney, Agent, or Firm* — Richard G. Miller

(57) ABSTRACT

The invention provides an aircraft with an auxiliary power unit isolated from the aircraft. An auxiliary power unit suspension system includes at least one suspension linkage. The suspension linkage terminates with a first low stiffness elastomeric rod end. The low stiffness elastomeric rod end has a low spring rate with the aircraft auxiliary power unit suspension system providing the aircraft auxiliary power unit with a suspended auxiliary power unit natural frequency, the suspended auxiliary power unit natural frequency below the aircraft auxiliary power unit operation frequency.

42 Claims, 23 Drawing Sheets

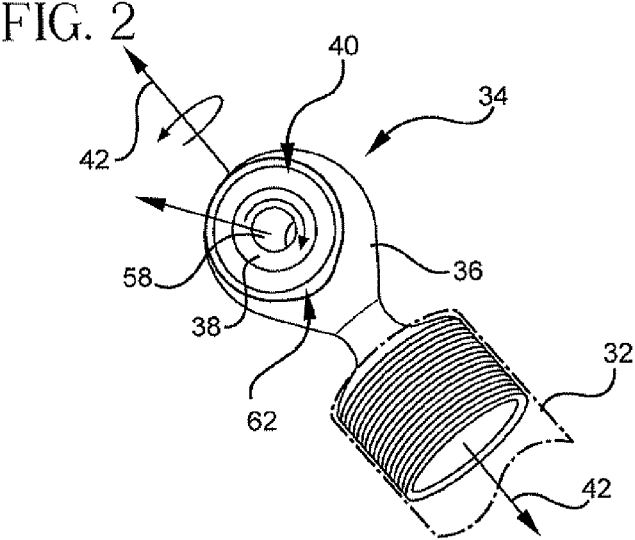
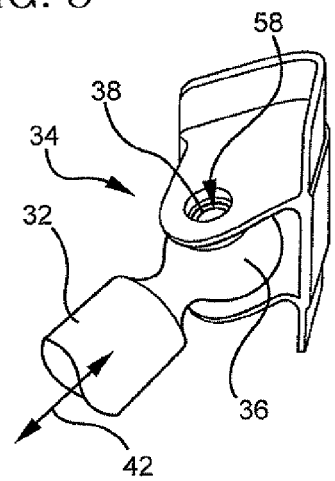
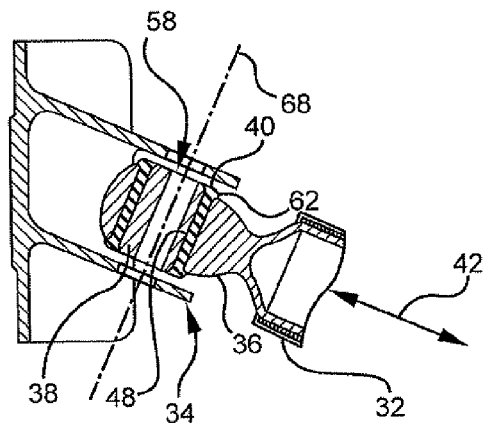
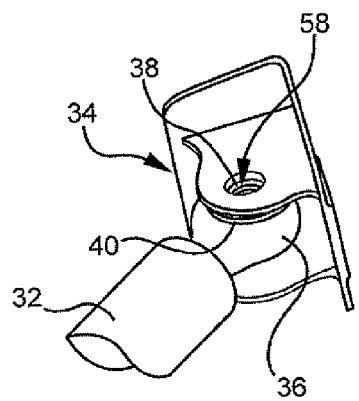
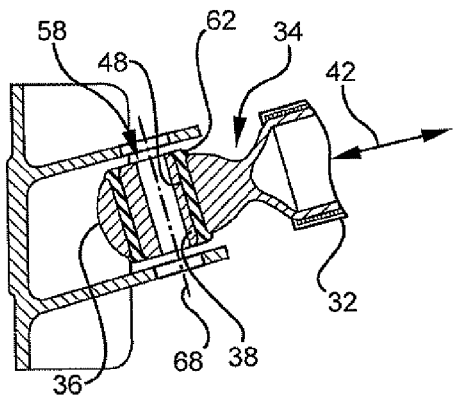

FIG. 13

Suspended APU Natural Frequencies for a "Soft" Rod End System

Below the generator & Turbine Operational (Driving) Frequencies
& Above the Main Engine Wind Milling (Driving) Frequency Range

"Soft" Rod End System Natural Freq (Hz)

1. 20.1-Pitch (deflecting the fore)
2. 25.4-Yaw about the middle and Roll
3. 28.5-Yaw about the right fore
4. 37.0-Yaw about the right fore
5. 54.8-Pitch (deflecting the aft)
6. 62.7-Yaw with pitch exciting lateral strut

FIG. 14

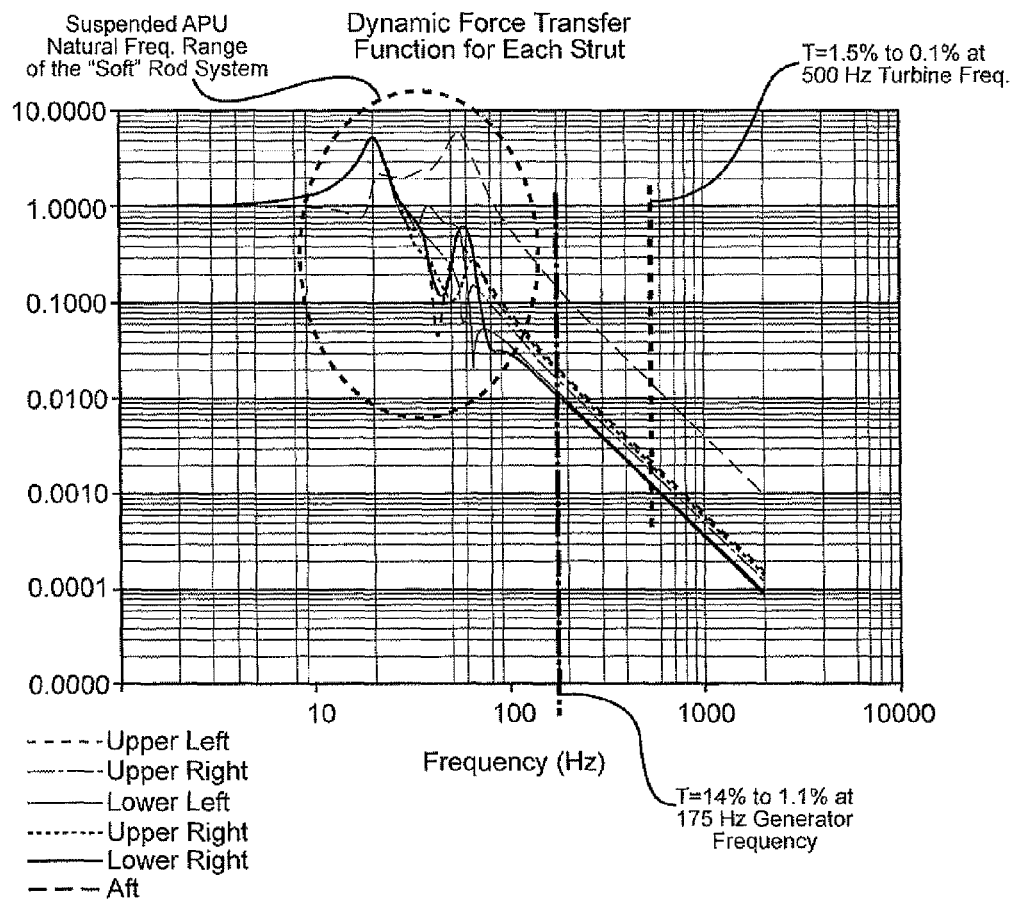

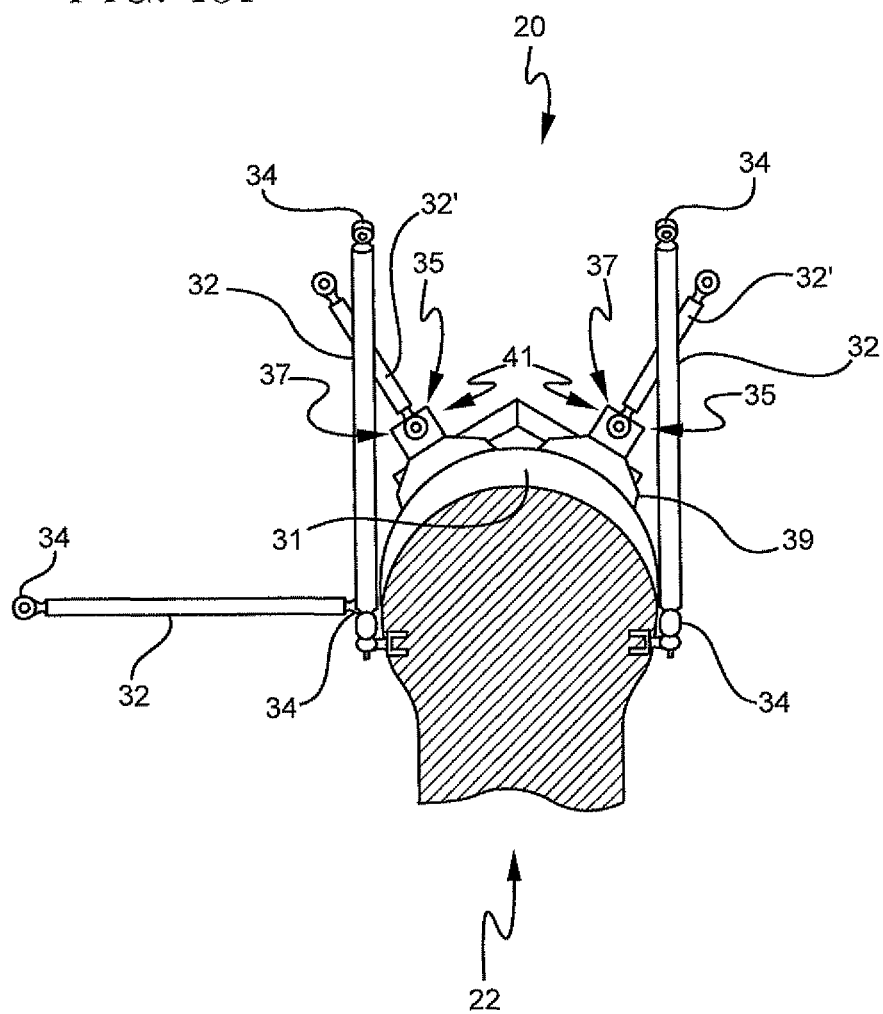

AIRCRAFT AUXILIARY POWER UNIT SUSPENSION SYSTEM FOR ISOLATING AN AIRCRAFT AUXILIARY POWER UNIT

CROSS REFERENCE

This application is a Continuation of pending U.S. patent application Ser. No. 11/397,208 filed Apr. 4, 2006 now U.S. Pat. No. 7,878,448, and U.S. patent application Ser. No. 11/397,208 claims the benefit of U.S. Provisional Patent Application 60/1668,030 filed on Apr. 4, 2005. The benefit of all of the above are hereby claimed and all of the above are hereby incorporated by reference.

FIELD OF THE INVENTION

The present invention relates to an aircraft auxiliary power unit and a method of isolating an auxiliary power unit in an aircraft. More particularly the invention relates to an aircraft auxiliary power unit suspension system for isolating an aircraft auxiliary power unit and methods for making aircraft auxiliary power unit suspension system that isolate the auxiliary power unit from the aircraft it is mounted to.

BACKGROUND OF THE INVENTION

There is a need for an effective and economical means for making aircraft auxiliary power unit suspension systems with improved performance and reliability. There is a need for economically feasible aircraft auxiliary power unit suspension system for isolating an aircraft auxiliary power unit in an aircraft. There is a need for a robust system and method of making isolating aircraft auxiliary power unit suspension systems.

SUMMARY

The invention includes an aircraft auxiliary power unit suspension system for isolating an aircraft auxiliary power unit having at least one aircraft auxiliary power unit operation frequency. The aircraft auxiliary power unit suspension system preferably includes at least one suspension linkage. Preferably the at least one suspension linkage terminates with a first low stiffness elastomeric rod end, wherein the low stiffness elastomeric rod end has a low spring rate wherein the aircraft auxiliary power unit suspension system provides the aircraft auxiliary power unit with a suspended auxiliary power unit natural frequency below the aircraft auxiliary power unit operation frequency.

The invention includes a method of making an aircraft auxiliary power unit suspension system for isolating an aircraft auxiliary power unit having a center of gravity and at least one aircraft auxiliary power unit operation frequency. Preferably the method includes providing a first suspension linkage. Preferably the first suspension linkage terminates with a first suspension linkage first low stiffness rod end, with the first suspension linkage first low stiffness rod end having a low spring rate. Preferably the method includes providing a second suspension linkage, the second suspension linkage terminating with a second suspension linkage first low stiffness rod end, the second suspension linkage first low stiffness rod end having a low spring rate. Preferably the first suspension linkage first low stiffness rod end low spring rate and the second suspension linkage first low stiffness rod end low spring rate provide isolation of the aircraft auxiliary power unit with the aircraft auxiliary power unit having a suspended auxiliary power unit natural frequency, the suspended auxiliary power unit natural frequency below the aircraft auxiliary power unit operation frequency.

The invention includes a method of making an aircraft auxiliary power unit suspension system linkage for isolating an aircraft auxiliary power unit having at least one aircraft auxiliary power unit operation frequency. Preferably the method includes providing a first auxiliary power unit rigid longitudinal rod suspension linkage having a longitudinal length. Preferably the method includes providing a first auxiliary power unit suspension linkage first low stiffness rod end, the first auxiliary power unit suspension linkage first low stiffness rod end having a low spring rate. Preferably the method includes attaching the first auxiliary power unit suspension linkage first low stiffness rod end to a first end of the first suspension linkage to provide an aircraft auxiliary power unit suspension system linkage with a resilient spring line of action running along the longitudinal length of the longitudinal rod and through the first suspension linkage first low stiffness rod end.

The invention includes an aircraft auxiliary power unit suspension system for isolating an aircraft auxiliary power unit having at least one aircraft auxiliary power unit operation frequency. Preferably the aircraft auxiliary power unit suspension system includes at least one suspension linkage, the suspension linkage terminating with a first low stiffness resilient rod end. Preferably the low stiffness resilient rod end has a low spring rate wherein the aircraft auxiliary power unit suspension system provides the aircraft auxiliary power unit with a suspended auxiliary power unit natural frequency, the suspended auxiliary power unit natural frequency below the aircraft auxiliary power unit operation frequency.

The invention includes a power unit suspension system for isolating a power unit having at least one power unit operation frequency. Preferably the power unit suspension system includes at least one suspension linkage, the suspension linkage terminating with a first low stiffness resilient rod end, the low stiffness resilient rod end has a low spring rate wherein the power unit suspension system provides the power unit with a suspended power unit natural frequency, the suspended power unit natural frequency below the power unit operation frequency.

The invention includes a power unit suspension system for isolating a power unit having at least one power unit operation frequency. Preferably the power unit suspension system includes at least one longitudinal suspension linkage, the suspension linkage including a vibration absorbing spring and a vibration absorbing mass with the vibration absorbing mass attached to the suspension linkage with the vibration absorbing spring. Preferably the suspension linkage terminates with a first low stiffness resilient rod end, wherein the low stiffness resilient rod end has a low spring rate wherein the power unit suspension system provides the power unit with a suspended power unit natural frequency, the suspended power unit natural frequency below the power unit operation frequency.

The invention includes an aircraft auxiliary power unit suspension system for isolating an aircraft auxiliary power unit having at least one aircraft auxiliary power unit operation frequency and the aircraft auxiliary power unit having a center of gravity. Preferably the aircraft auxiliary power unit suspension system includes at least a first upper suspension linkage, the at least first upper suspension linkage oriented with the aircraft auxiliary power unit center of gravity. Preferably the at least first suspension linkage terminates with a first outboard low stiffness resilient rod end and a distal first inboard linkage end proximate the aircraft auxiliary power unit, the low stiffness resilient rod end having a low spring rate wherein said aircraft auxiliary power unit suspension system provides the aircraft auxiliary power unit with a suspended auxiliary power unit natural frequency, the suspended auxiliary power unit natural frequency below the aircraft auxiliary power unit operation frequency.

The invention includes an aircraft auxiliary power unit suspension system for isolating an aircraft auxiliary power unit having at least one aircraft auxiliary power unit operation frequency, the aircraft auxiliary power unit having a center of gravity. Preferably the aircraft auxiliary power unit suspension system comprised of a first upper suspension linkage and a second upper suspension linkage, the first upper suspension linkage and the second upper suspension linkage oriented with the aircraft auxiliary power unit center of gravity, the first suspension linkage terminating with a first outboard low stiffness resilient rod end and a distal first inboard linkage end proximate the aircraft auxiliary power unit, the second suspension linkage terminating with a second outboard low stiffness resilient rod end and a distal second inboard linkage end proximate the aircraft auxiliary power unit, wherein the low stiffness resilient rod ends have a low spring rate wherein the aircraft auxiliary power unit suspension system provides the aircraft auxiliary power unit with a suspended auxiliary power unit natural frequency, the suspended auxiliary power unit natural frequency below the aircraft auxiliary power unit operation frequency.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BRIEF DESCRIPTION OF THE DRAWINGS

FIG. 2 shows an APU suspension system rod end.
FIG. 3 shows an APU suspension system rod end.
FIG. 4 shows an APU suspension system rod end.
FIG. 5 shows an APU suspension system rod end.
FIG. 6 shows an APU suspension system rod end.
FIG. 13 shows APU Natural Frequencies.
FIG. 14 shows APU Natural Frequencies.
FIG. 19A-H show APU rod end suspension systems.

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

The invention includes an aircraft auxiliary power unit suspension system for isolating an aircraft auxiliary power unit having at least one aircraft auxiliary power unit operation frequency and a center of gravity. Preferably the aircraft auxiliary power unit suspension system is a focalized system. In an embodiment the aircraft auxiliary power unit suspension system is partially focalized. In an embodiment the aircraft auxiliary power unit suspension system is a fully focalized system. Preferably the aircraft auxiliary power unit suspension system isolates an aircraft auxiliary power unit with a first low operation frequency-generator, and a second high operation frequency, preferably with the first low operation frequency being a generator operation frequency and the second high operation frequency being a turbine operation frequency. The aircraft auxiliary power unit suspension system is comprised of at least one rigid longitudinal suspension linkage, the suspension linkage terminating with a first low stiffness elastomeric rod end, wherein the low stiffness elastomeric rod end has a low spring rate wherein the aircraft auxiliary power unit suspension system provides the aircraft auxiliary power unit with a suspended auxiliary power unit natural frequency, the suspended auxiliary power unit natural frequency below the aircraft auxiliary power unit operation frequency. Preferably the suspended auxiliary power unit natural frequency is above a lower frequency limit, with the lower frequency being the main engine windmilling excitation frequency. Preferably the aircraft auxiliary power unit suspension system provides a suspended auxiliary power unit natural frequency with a natural frequency band upper limit below the aircraft auxiliary power unit operation frequency and a natural frequency band lower limit above main engine windmilling excitation frequency. Preferably the natural frequency band lower limit is above about 5-20 Hz, more preferably above 9 to 20 Hz, and more preferably above 20 Hz.

Figure 19A:
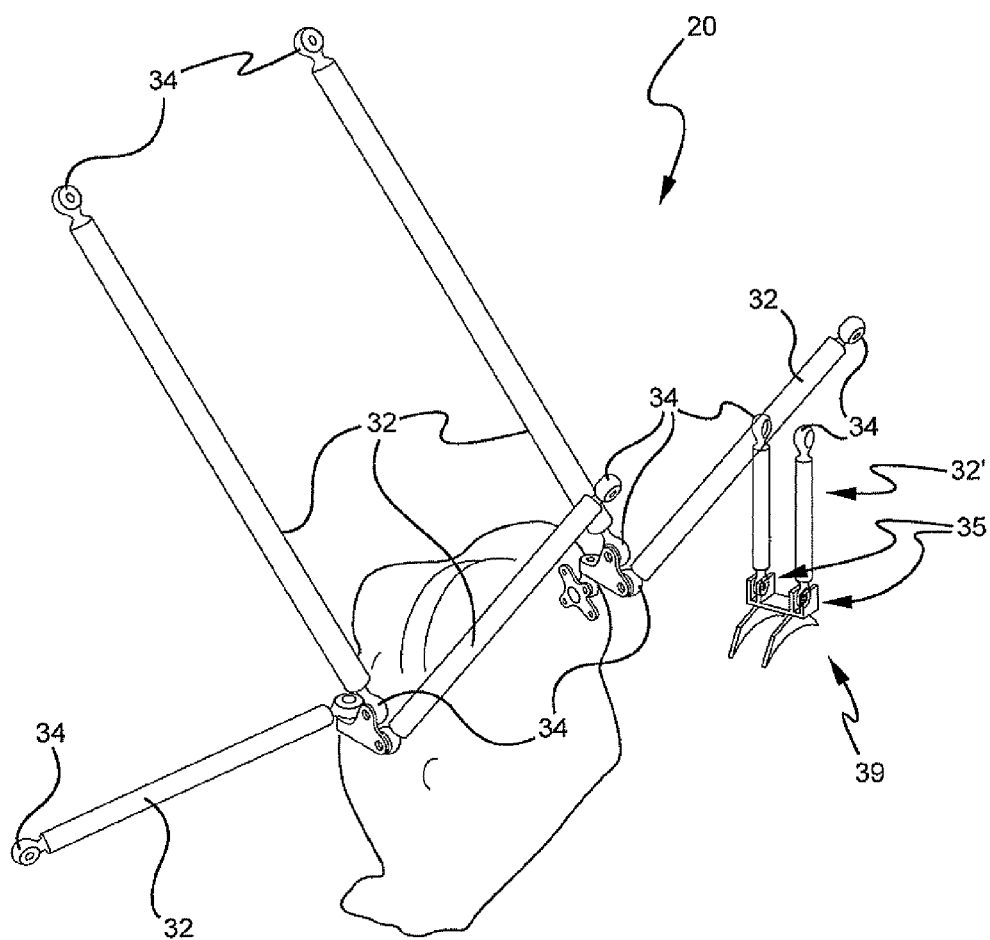
Figure 19B:
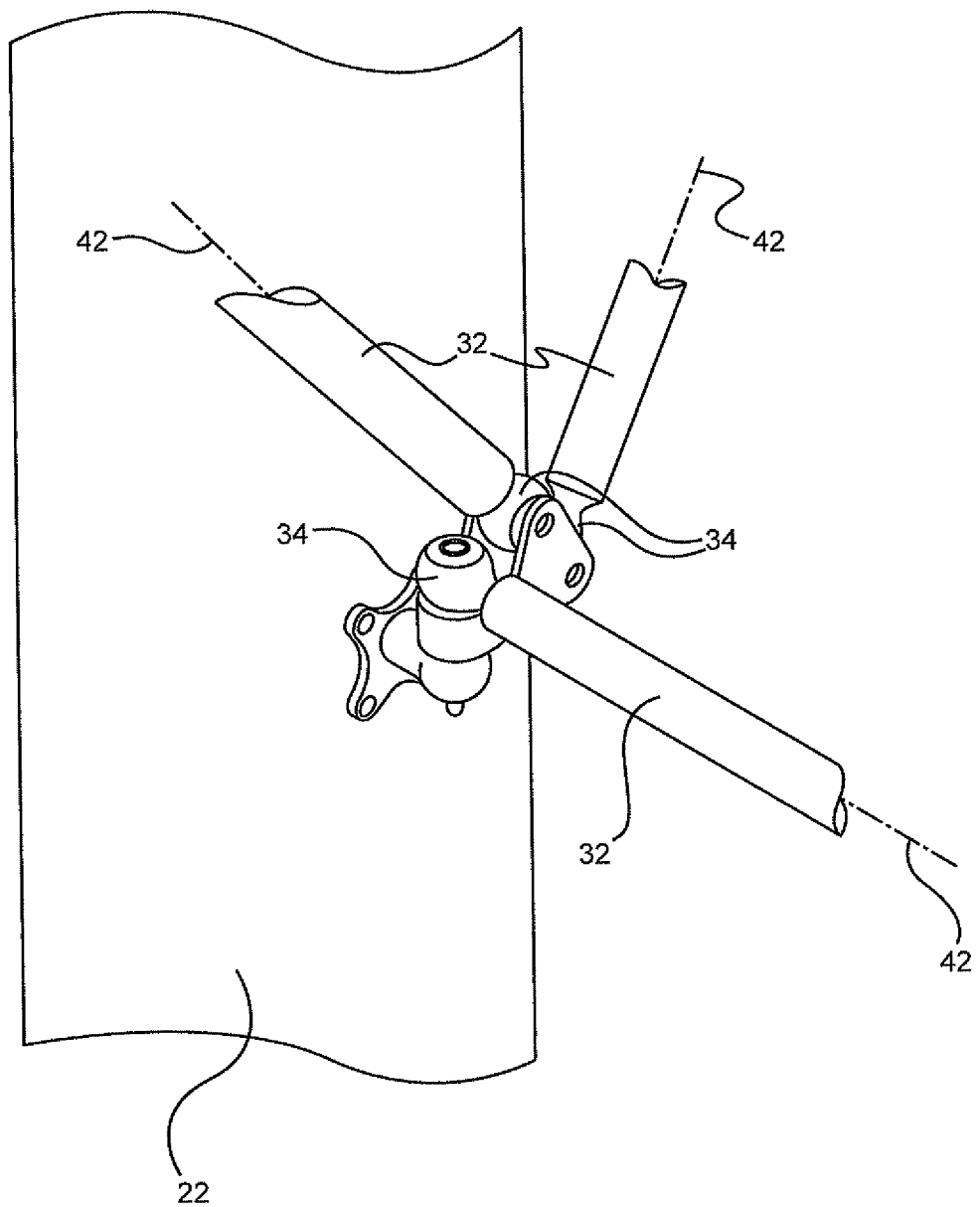
Figure 19C:
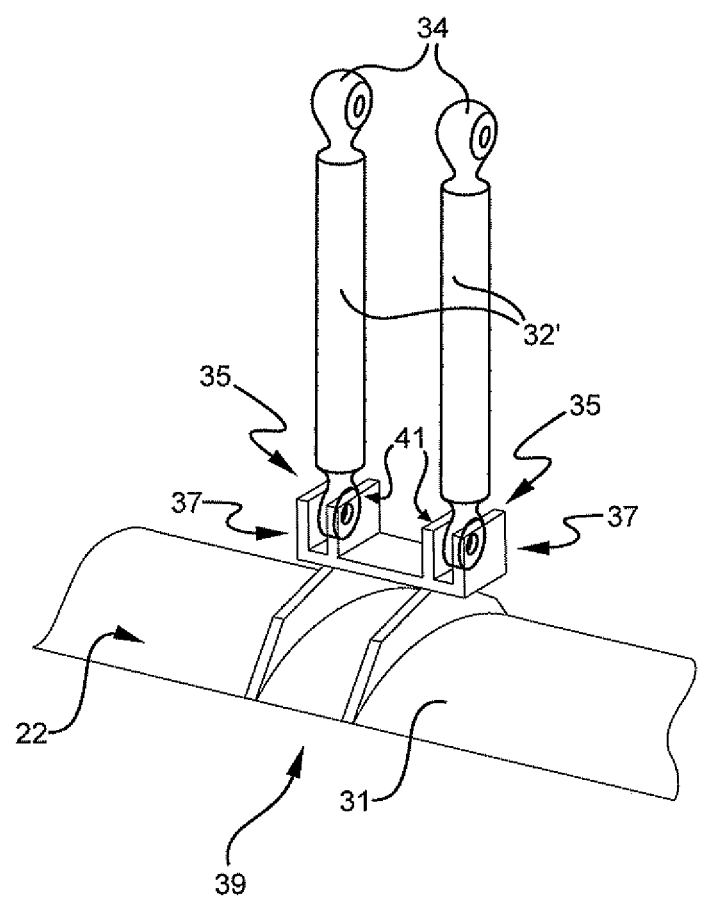
Figure 19D:
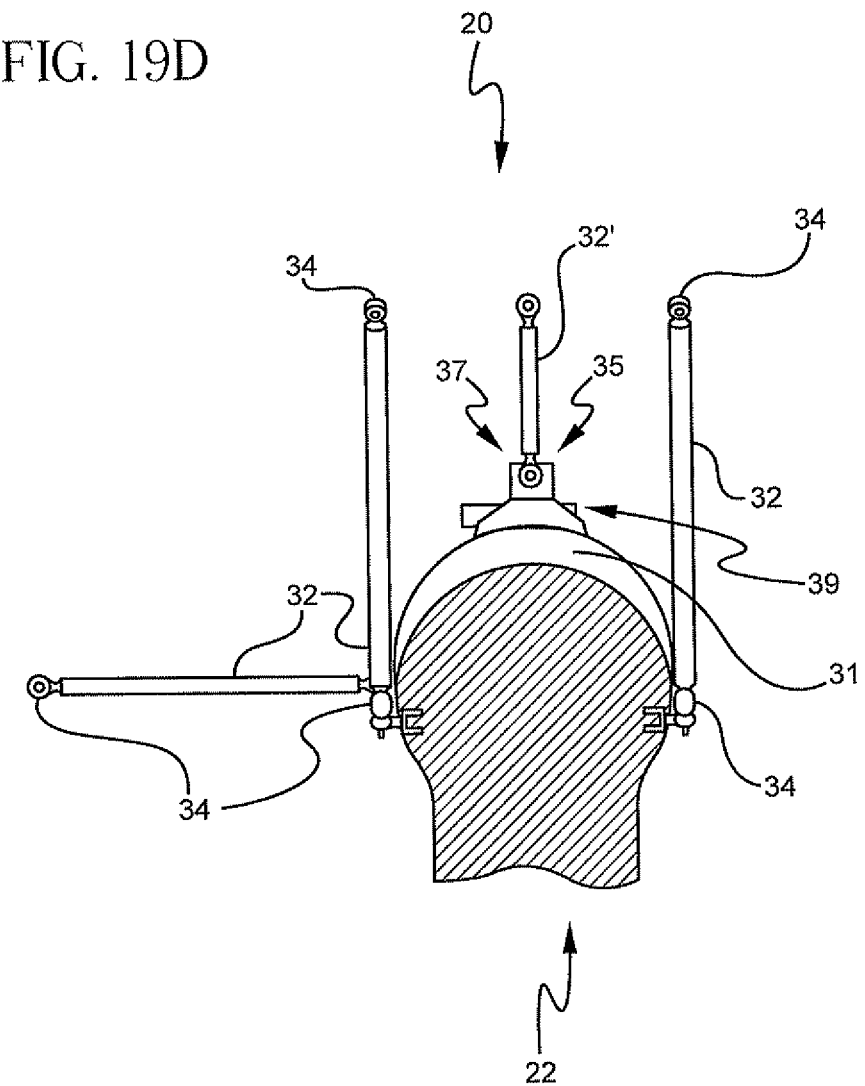
Figure 19E:
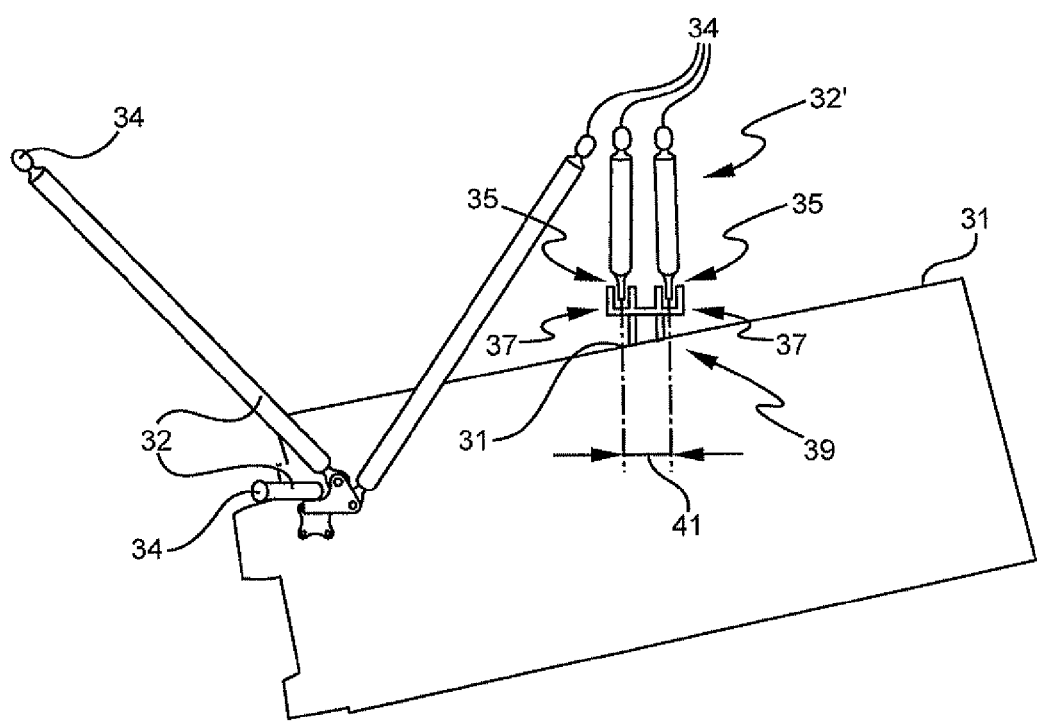
Figure 19G:
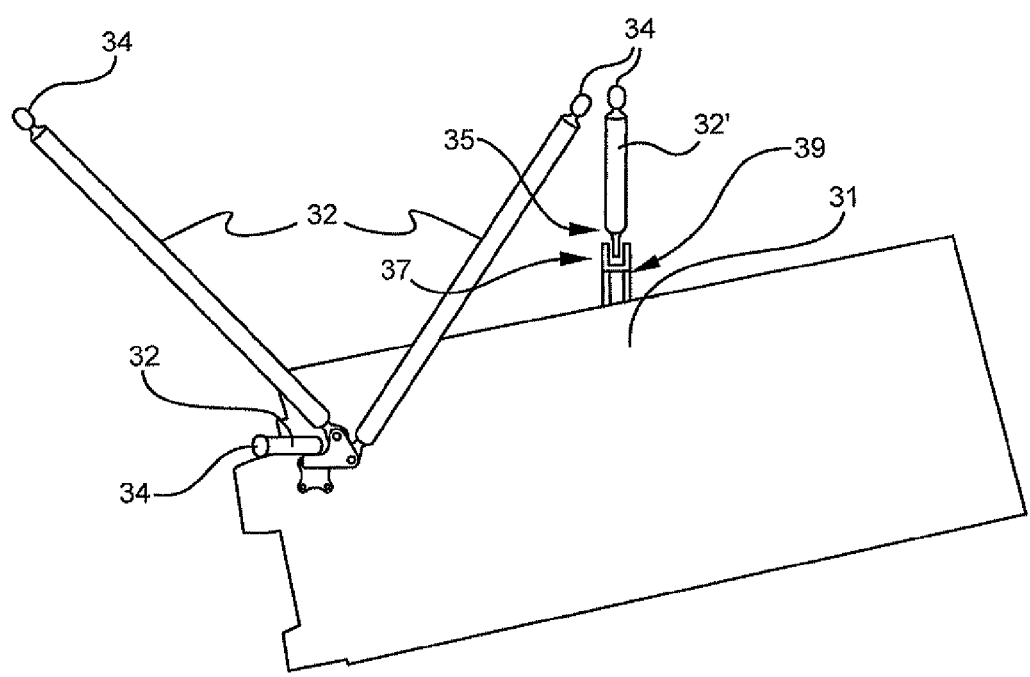
Figure 19H:
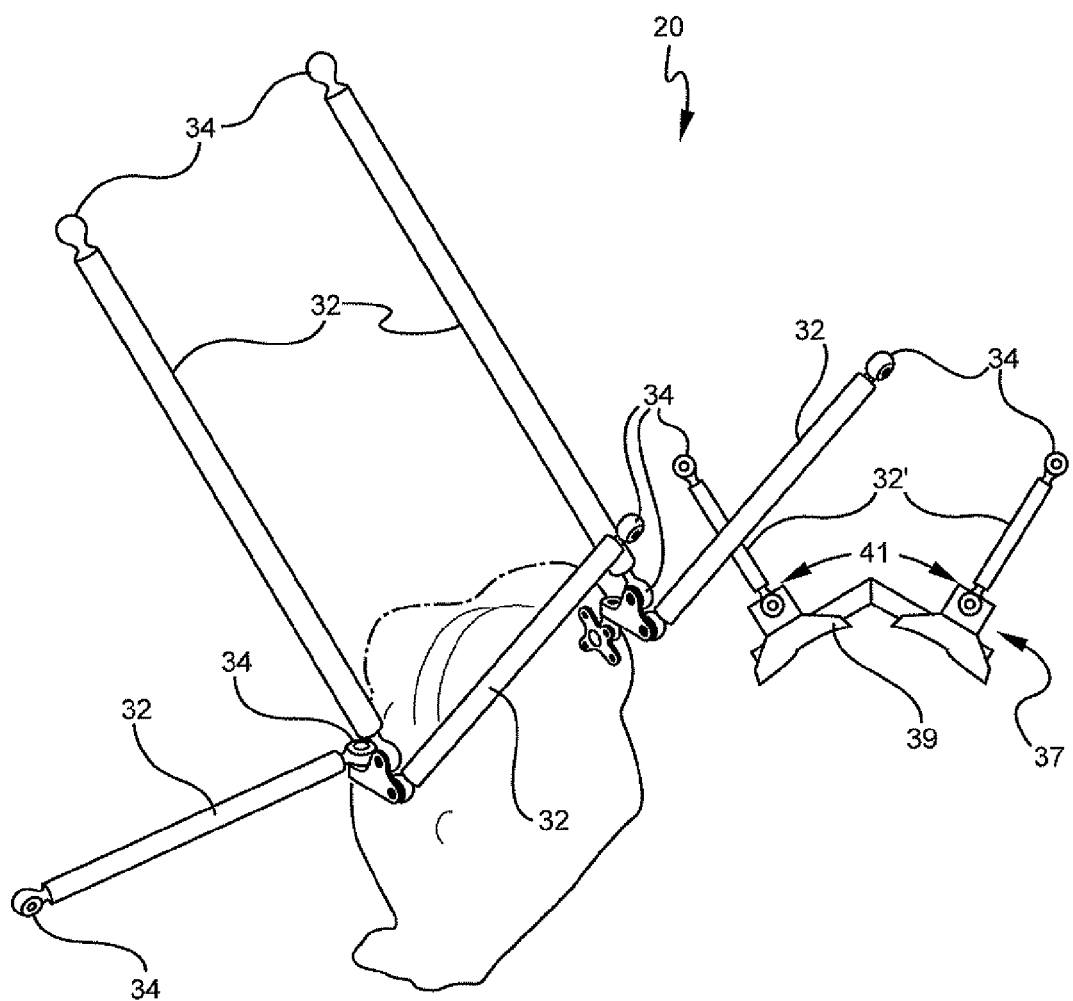
Figure 20A:
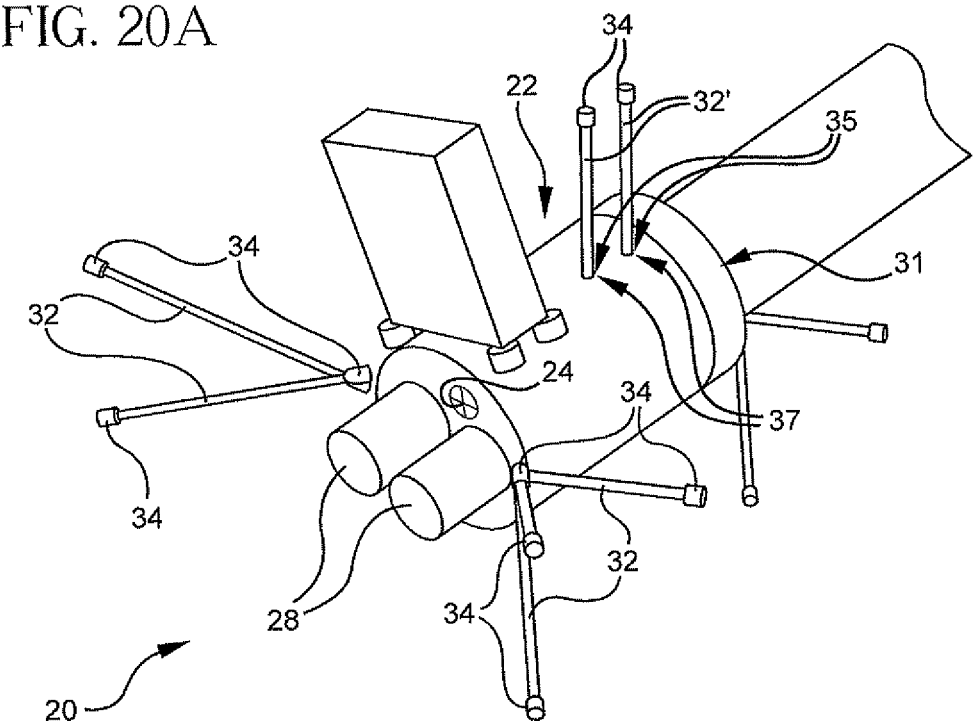
FIG. 20A-E show APU rod end suspension systems.
Figure 20B:
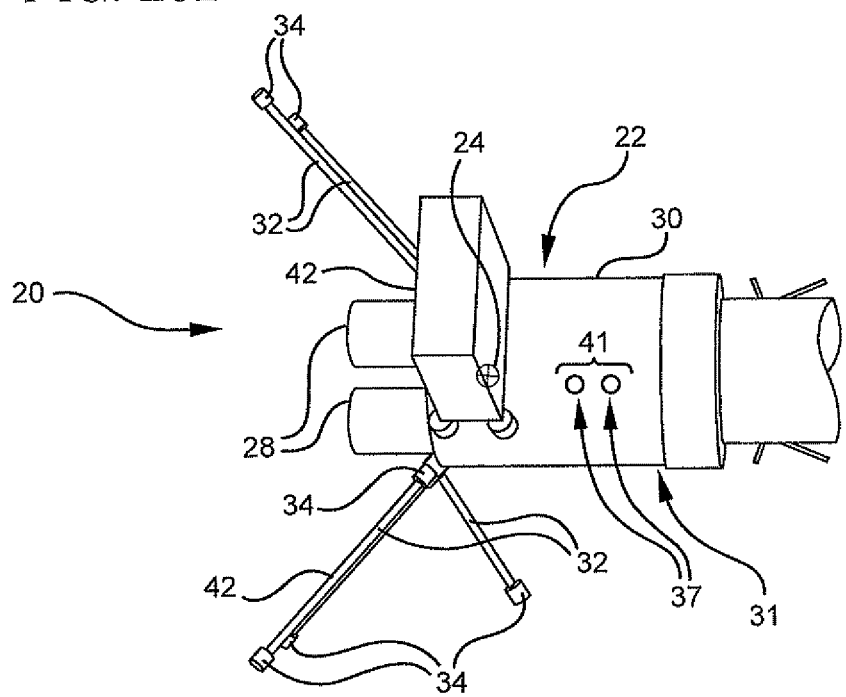
Figure 20C:
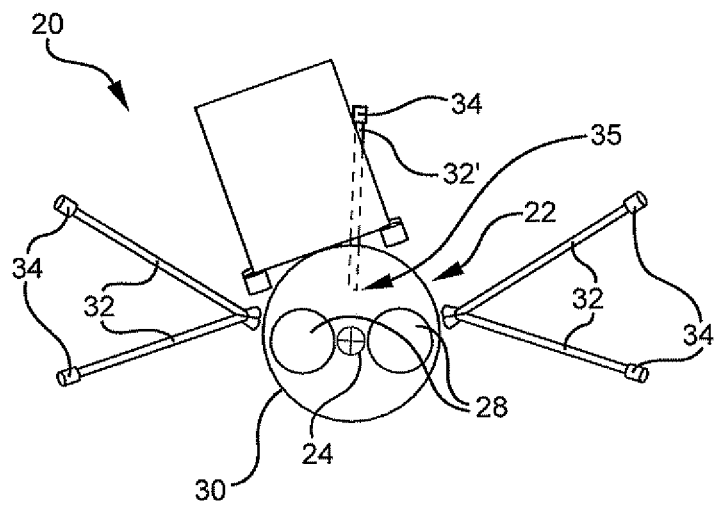
Figure 20D:
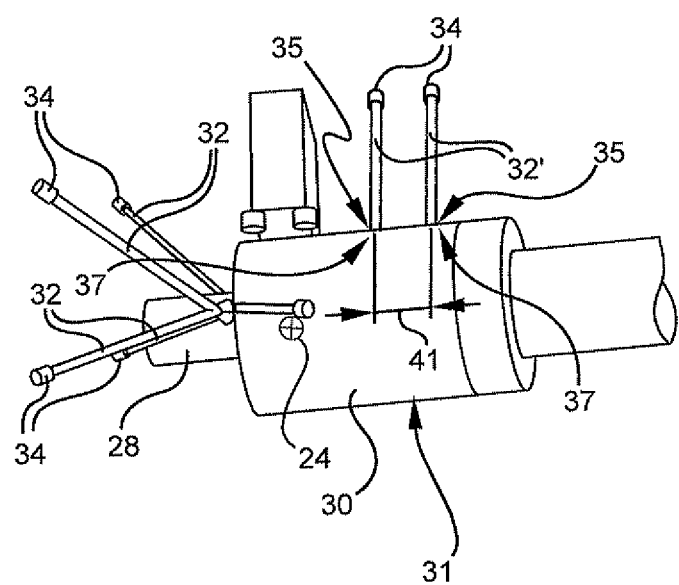
Figure 20E:
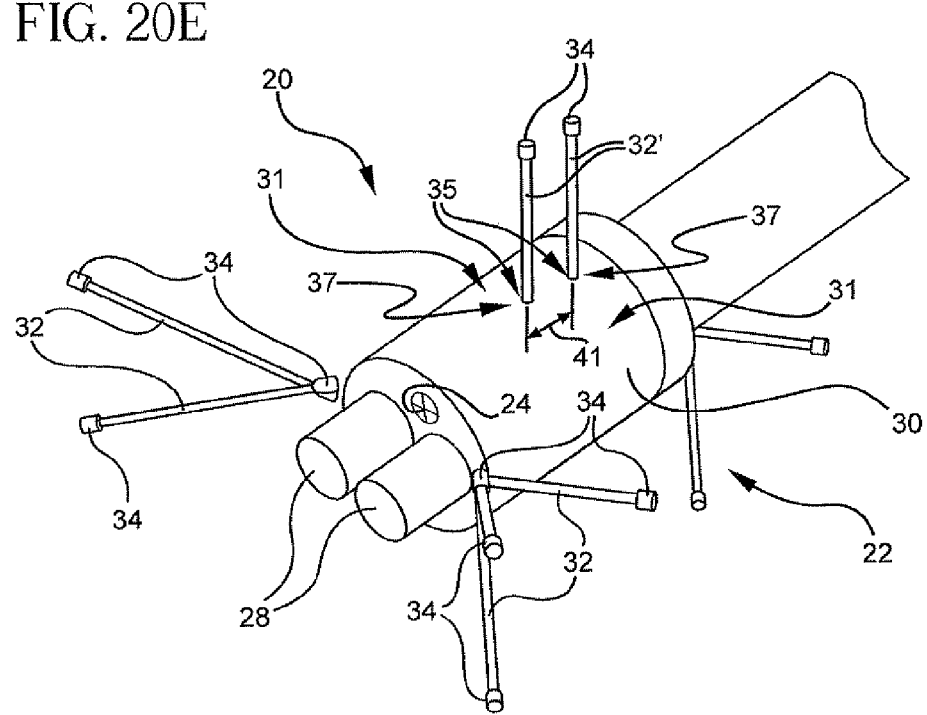
Figure 21:
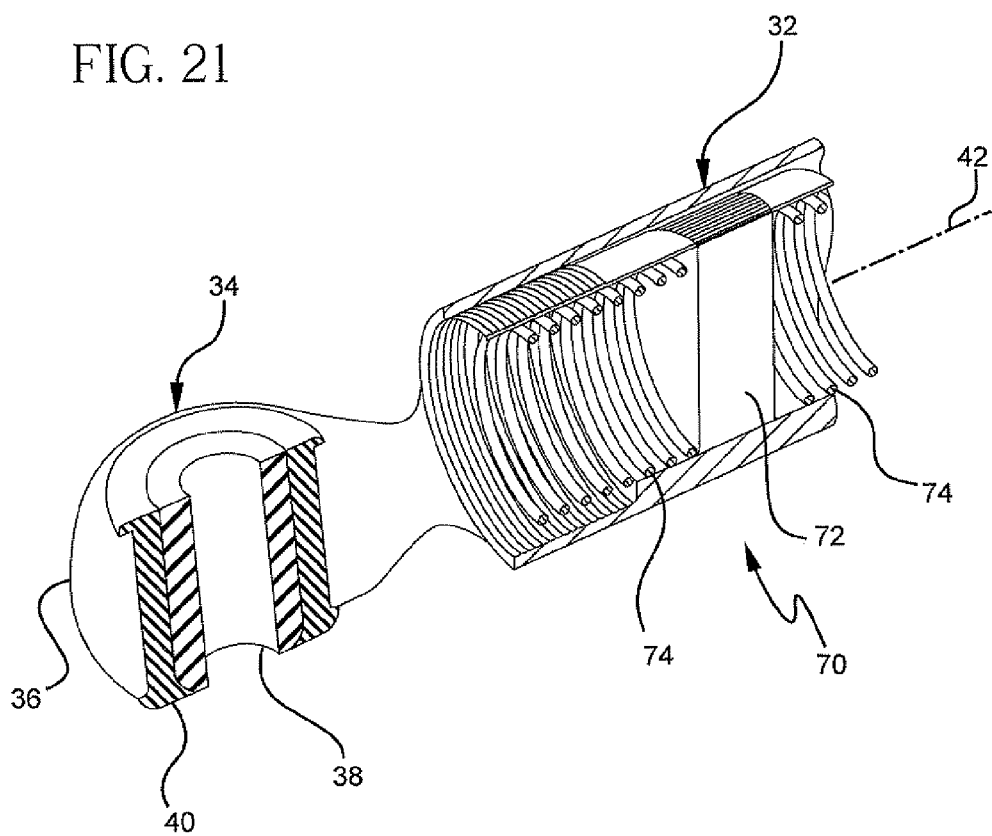
FIG. 21 shows an APU suspension system linkage TVA.
Figure 22:
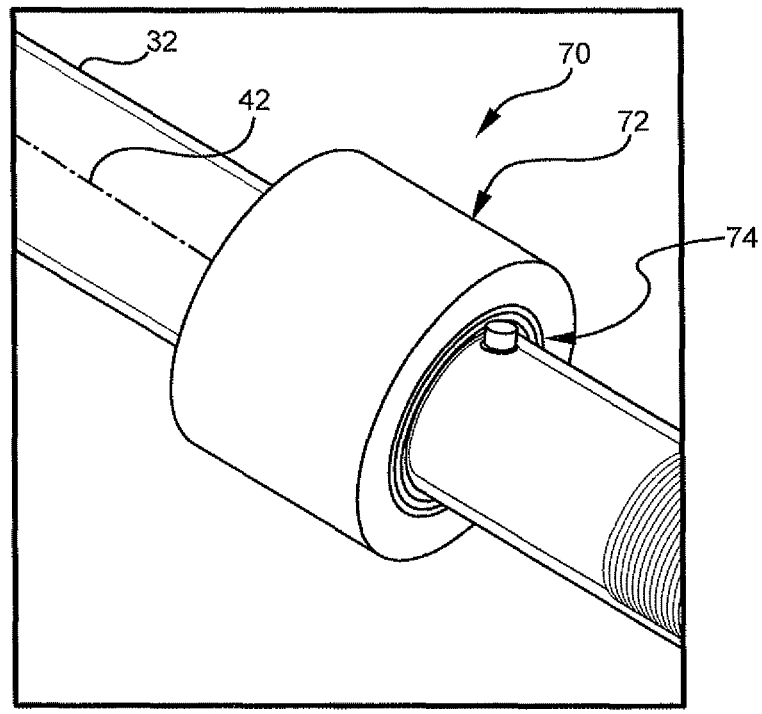
FIG. 22 shows an APU suspension system linkage TVA.
Figure 23:
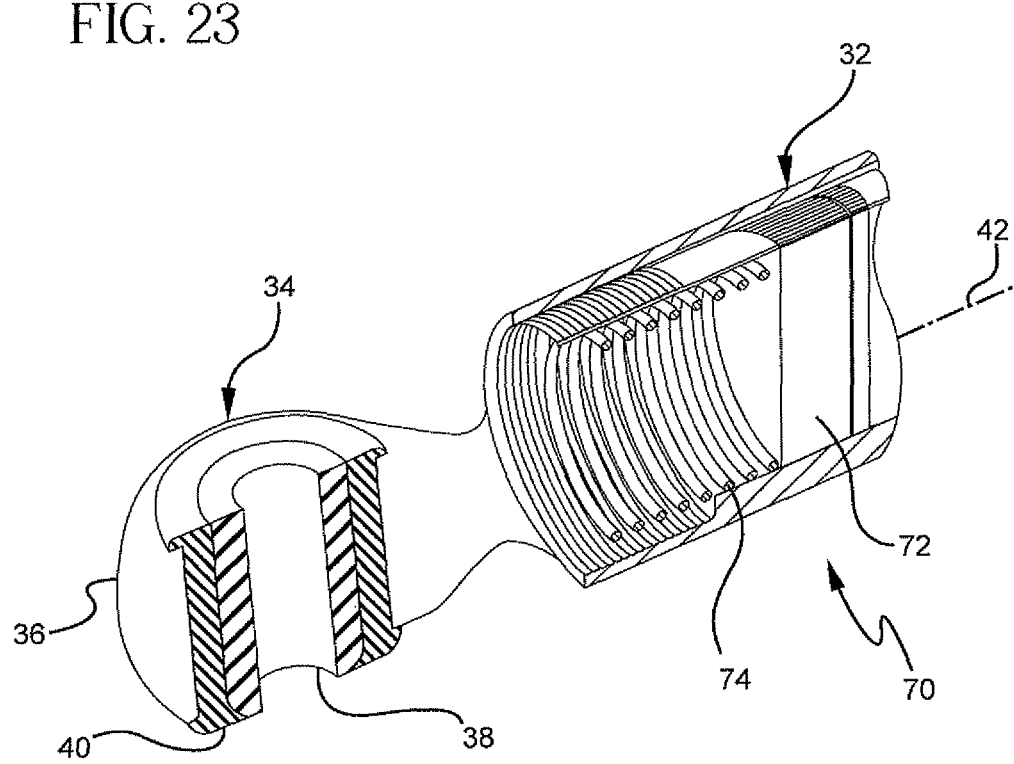
FIG. 23 shows an APU suspension system linkage TVA.
Figure 24:
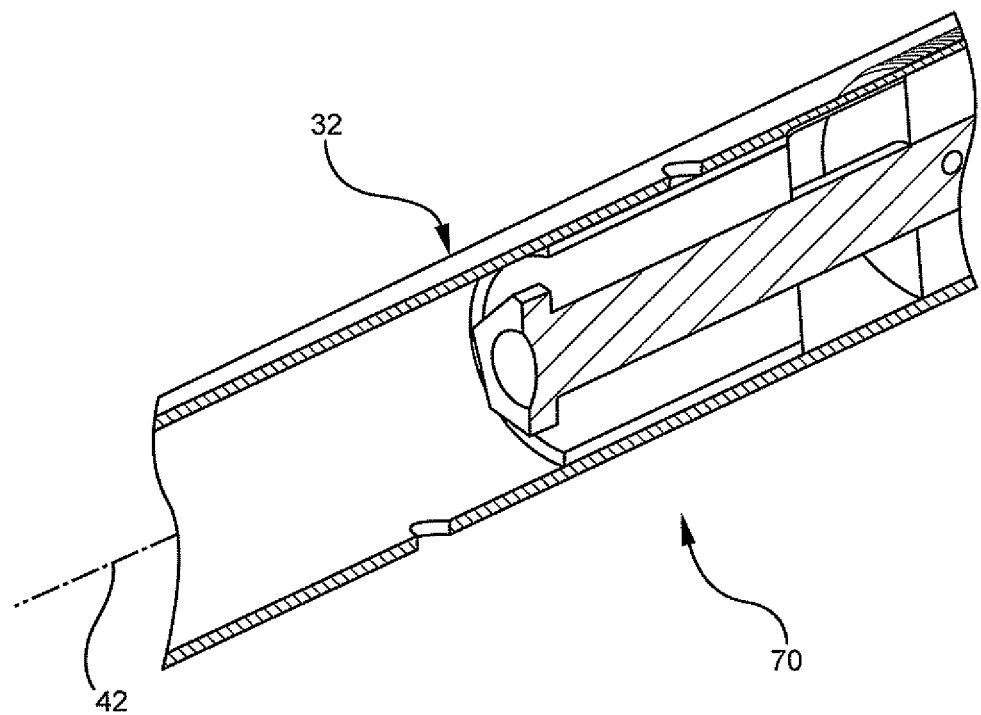
FIG. 24 shows an APU suspension system linkage TVA.

The aircraft auxiliary power unit suspension system 20 for isolating an aircraft auxiliary power unit 22 having at least one aircraft auxiliary power unit operation frequency and a center of gravity 24. Preferably the aircraft auxiliary power unit suspension system 20 is a focalized system. In an embodiment the aircraft auxiliary power unit suspension system is partially focalized. In an embodiment the aircraft auxiliary power unit suspension system is a fully focalized system. Preferably the aircraft auxiliary power unit suspension system 20 isolates an aircraft auxiliary power unit 22 with a first low operation frequency of a generator 28, and a second high operation frequency of a turbine 30. Preferably with the first low operation frequency is the generator operation frequency and the second high operation frequency is the turbine operation frequency. The aircraft auxiliary power unit suspension system 20 is comprised of at least one rigid longitudinal suspension linkage 32, the suspension linkage terminating with a first low stiffness elastomeric rod end 34, wherein the low stiffness elastomeric rod end 34 has a low spring rate wherein the aircraft auxiliary power unit suspension system 20 provides the aircraft auxiliary power unit 22 with a suspended auxiliary power unit natural frequency, the suspended auxiliary power unit natural frequency below the aircraft auxiliary power unit operation frequency. Preferably the suspended auxiliary power unit natural frequency is above a lower frequency limit, with the lower frequency being the main engine windmilling excitation frequency of the aircraft. Preferably the aircraft auxiliary power unit suspension system provides a suspended auxiliary power unit natural frequency with a natural frequency band upper limit below the aircraft auxiliary power unit operation frequency and a natural frequency band lower limit above main engine windmilling excitation frequency. Preferably the natural frequency band lower limit is above about 5-20 Hz, more preferably above 9 to 20 Hz, and more preferably above 20 Hz. As shown in FIG. 1, the aircraft auxiliary power unit (Auxiliary Power Unit-APU) suspension system 20 includes longitudinal suspension linkages 32 that have low stiffness elastomeric rod ends 34 on both ends and longitudinal suspension linkages 32 with only a single rod end 34 on the longitudinal suspension linkage strut. In preferred embodiments preferably at least one longitudinal suspension linkage strut 32 with only a single rod end 34 is utilized with the other longitudinal suspension linkages 32 with low stiffness elastomeric rod ends 34 on both ends. In a preferred embodiment two longitudinal suspension upper linkage struts 32' with only one rod end 34 each at the outboard end distal from the APU is utilized with the other longitudinal suspension linkages 32 with low stiffness elastomeric rod ends 34 on both ends. As shown in FIG. 19-20 in preferred embodiments at least two upper suspension linkages, preferably a first (fore) upper suspension linkage 32' and a second (aft) upper suspension linkage 32' provide an aligned pair of upper suspension linkages 32', with inboard non-compliant nonelastomeric metal spherical bearing linkage ends 35, preferably with the inboard non-compliant bearing linkage ends 35 comprised of metal spherical bearings. The distal ends of the upper suspension linkages 32' are preferably the outboard elastomeric rod ends 34. Preferably the first fore upper suspension linkage 32' and the second aft upper suspension linkage 32' are connected to the APU at a first fore and a second aft APU connection points 37 above the APU combustor section 31. Preferably the first fore and second aft APU connection points 37 and the pair of upper suspension linkages 32' are aligned with the center of gravity 24 axis through the APU, preferably with an APU connection point bracket 39 having a fore linkage end attachment point 37 for the first upper suspension linkage 32' and an aft linkage end attachment point 37 for the second upper suspension linkage 32', preferably separated by a predetermine separation distance 41. Preferably the APU connection point bracket predetermine separation distance 41 is greater than the casing burn thru crack dimension for cracked combustion flame diameter for the APU turbine combuster 31. Preferably the aircraft auxiliary power unit 22 has a center of gravity 24. Preferably the aircraft auxiliary power unit suspension system first upper suspension linkage 32' and second upper suspension linkage 32' form a pair above the APU combuster 31. Preferably the first and second upper suspension linkages 32' are oriented with the aircraft auxiliary power unit center of gravity 24. Preferably the first suspension linkage 32' terminates with the first outboard low stiffness resilient rod end 34 and the distal first inboard linkage end 35 proximate the APU. Preferably the second suspension linkage 32 terminates with the second outboard low stiffness resilient rod end 34 and distal second inboard linkage end 35 proximate the APU. The low stiffness resilient rod ends 34 of the system preferably have low spring rates wherein the aircraft auxiliary power unit suspension system provides the aircraft auxiliary power unit with a suspended auxiliary power unit natural frequency, with the suspended auxiliary power unit natural frequency below the aircraft auxiliary power unit operation frequency. This orientation is preferred for aft end attachment fail-safe which minimizes APU deflections with the loss of one aft strut. In an alternative preferred embodiment is shown in FIG. 19F-H for forward mounting group loss (loss of the entire LH or RH attachment to the APU). In the preferred alternative embodiment full system fail-safety requirements (four fail-safe mounting groups), the two upper aft struts are arranged and oriented in a partially focalized manner (FIGS. 19F & 19G). The hard bearing attachment directly to the aft combustor case is preferably done with the APU connection point bracket predetermine separation distance 41 (fore and aft spacing) but clocked around the combustor attachment ring (FIG. 19F). In a preferred embodiment the upper linkages 32' are oriented at positions with the struts aligned so that their major axis points focused proximate or at the APU center of gravity (e.g.) (as projected on that plane), such as about the 10 o'clock and 2 o'clock positions separated by about ninety degrees, preferably pointing just beyond (below) the projected APU e.g. or at or least desirably (but acceptably) before (above) the projected APU e.g. These orientations permit partial focalization which minimizes APU motions and allow for safe retention of the APU should one aft strut, fail or either of the forward LH or RH mounting groups should fail.

Figure 18A:
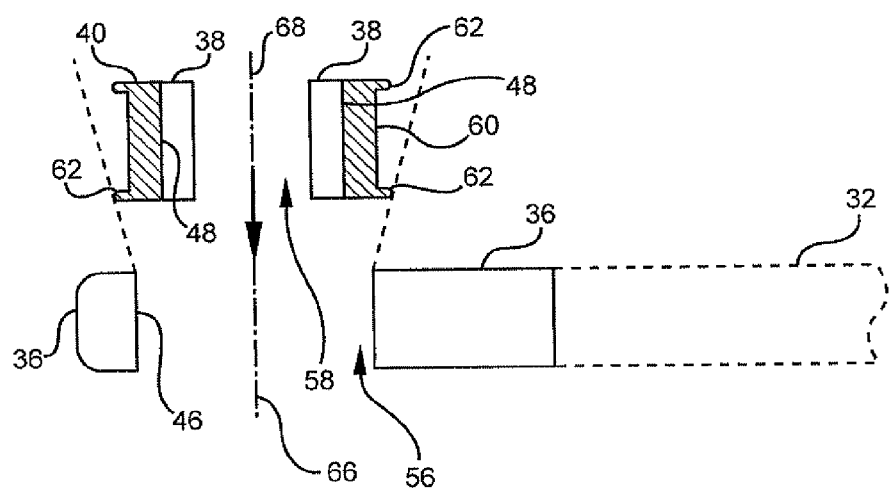
FIGS. 18A-B shows an APU suspension system rod end method.
Figure 18B:
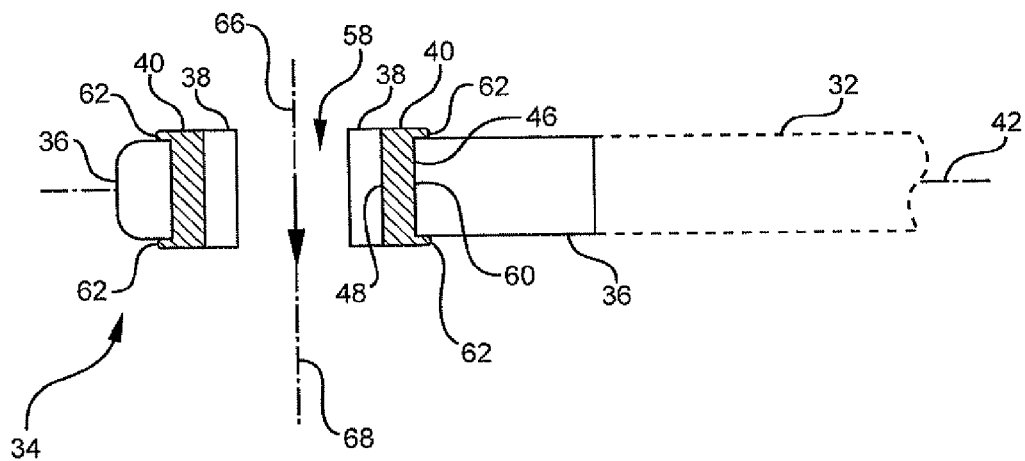

Preferably the suspension linkage 32 terminates with a distal second low stiffness elastomeric rod end 34, wherein the first low stiffness elastomeric rod end 34 and the distal second low stiffness elastomeric rod end 34 in series provide the suspended auxiliary power unit natural frequency below the aircraft auxiliary power unit operation frequency. In preferred embodiments the two distal rod ends 34 have a doubled stiffness in comparison if only one rod end is used on each linkage. As shown in FIG. 2, rod end 34 preferably includes a rigid nonextensible outer member 36, a rigid nonextensible inner member 38, and an intermediate elastomer 40 between the rigid nonextensible outer member 36 and the rigid nonextensible inner member 38, the intermediate elastomer 40 bonded to the rigid nonextensible inner member 38. Preferably the rigid nonextensible inner member 38 has an outer bonding surface 48 with the intermediate elastomer 40 bonded to the rigid nonextensible inner member outer bonding surface 48, such as shown in FIG. 4,6, and 18. Preferably the rigid nonextensible inner member outer bonding surface 48 is comprised of a cylindrical shell surface. Preferably the rigid nonextensible inner member 38 is a cylindrical tubular inner member. Preferably the rigid nonextensible inner member 38 is a cylindrical tubular inner member having a cylindrical tubular center bore 58 with a center bore axis 68. Preferably the rigid nonextensible inner member 38 is a cylindrical tubular inner member having a cylindrical tubular center bore 58 with a center bore axis 68, and the rigid nonextensible outer member 36 has a cylindrical tubular center bore 56 with an inner surface 46, the rigid outer member center bore 56 having a center axis 66, wherein the intermediate elastomer 40 and the rigid nonextensible inner member 38 are received in the rigid outer member center bore 56 with the rigid nonextensible inner member center bore axis 68 aligned with the rigid outer member center bore center axis 66. Preferably the rigid nonextensible outer member 36 has a cylindrical center bore 56 with an inner cylindrical bore surface 46, wherein the intermediate elastomer 40 has an unbonded outer surface 60 distal from the rigid inner member outer bonding surface 48, the intermediate elastomer unbonded outer surface 60 engaging the rigid outer member inner cylindrical bore surface 46. Preferably unbonded elastomer surface 60 frictionally engages the rigid outer member inner cylindrical bore surface 46, preferably with the rigid inner member 38 and bonded elastomer 40 pressfit into the bore 56, preferably with the unbonded elastomer outer surface 60 having a diameter greater than the inner cylindrical bore surface 46 of the rigid nonextensible outer member 36, preferably the unbonded elastomer surface 60 is unlubricated. Preferably lubrication of the unbonded elastomer surface interface with the inner cylindrical bore surface of the rigid outer member is inhibited to ensure frictional engagement there between. Preferably the intermediate elastomer 40 and the inner member 38 are mold bonded in an elastomer mold. Preferably the intermediate elastomer 40 is mold bonded to the rigid inner member outer bonding surface 48 in an elastomer mold, preferably with an elastomer to metal bonding adhesive ensuring the bonding of the elastomer to the metal outer bonding surfaces 48. Preferably the elastomer is bonded to the rigid nonextensible member metal outer bonding surfaces 48 with an elastomer to metal bonding agent, preferably an elastomer to metal bonding adhesive such as the Lord Chemlok elastomer to metal bonding system. Preferably the intermediate elastomer 40 is molded with outboard flanges 62, preferably elastomeric lips that have unbonded OD that is greater than the unbonded elastomer OD outer surface 60 that is engaging the rigid outer member inner cylindrical bore surface 46, with the elastomeric flanges 620D greater than the rigid outer member inner cylindrical bore surface ID.

Preferably the aircraft auxiliary power unit suspension system 20 for isolating an aircraft auxiliary power unit 22 is at least partially focalized, with the suspension strut linkages 32 having an elastomeric spring line of action 42 running along the longitudinal length of the linkage 32 and through the rod end 34, wherein the elastomeric spring lines of action 42 intersect at a focal elastic center axis, with the focal elastic center axis proximate the APU center of gravity 24. Preferably 3 elastic center axis planes intersect proximate the center of gravity 24 for a fully focalized system, preferably 2 elastic center axis planes intersect proximate the center of gravity 24 for a two thirds partially focalized system, and preferably the system is at least one third partially focalized with one elastic center axis plane proximate the center of gravity 24. Preferably the rod ends 34 provide for a focalized suspension system, with the suspension linkages 32 having an elastomeric spring line of action 42 running along the longitudinal length of the linkage 32 and through the rod end 34, wherein the elastomeric spring lines of action 42 intersect at a focal elastic center proximate the APU center of gravity 24. Preferably the APU 22 hangs from the structural surfaces of the aircraft on the suspension strut linkages 32, preferably with the majority of the center of gravity weight supported from above and the sides by the linkages 32, preferably while inhibiting a majority of the center of gravity weight from being supported from the bottom of the APU. Preferably the APU is hung by the linkages 32 (such as hung from front fire wall, ceiling) as compared with mounts below the center of gravity such as mounts between the APU bottom and aircraft floor. Preferably the long longitudinal linkage struts 32 are mainly under tension, not under compression, preferably at least some of the long longitudinal linkage struts 32, and preferably the majority are above the center of gravity 24, and not below the center of gravity.

Preferably the intermediate elastomer 40 has an intermediate elastomer thickness between the inner rigid member 38 and outer rigid member 36 that is greater than 0.05 inches (1.27 mm), preferably at least 0.06 inches (1.52 mm), and preferably at least 2 mm to give the rod end 34 the low spring rate. Preferably intermediate elastomer thickness is at least 0.1 inches (2.54 mm) to give the low spring rate, such as about 0.166 inches (4.2 mm). Preferably the rod end 34 low spring rate is less than 500,000 lbs./inch (87,000N/mm), preferably with a static shear modulus less than 250 psi. Preferably the rod end 34 low spring rate is less than 500,000 lbs./inch, preferably <300,000 lbs./inch, preferably <250,000 lbs./inch, preferably <200,000 lbs./inch, preferably <100,000 lbs./inch, preferably <50,000 lbs./inch. Preferably the rod end 34 low spring rate is in the range from 20,000 to 100,000 lbs./inch, preferably in the range from 20,000 to 50,000 lbs./inch.

Preferably the rod end low spring rate is provided by the elastomer thickness in proportion to the load area to produce a low shape factor part, with a shape factor of 0.25 to 5, with the elastomer shape factor giving the low spring rate. Preferably the no greater than 50,000 lbs./inch rod ends 34 provide the aircraft auxiliary power unit suspension system 20 with a suspended auxiliary power unit natural frequency below the about 200 Hz APU generator frequency (200±50 Hz, preferably 200±25 Hz, such as about 175 Hz) and below the about 500 Hz APU turbine frequency (500150, preferably 500±25 Hz, such as about 520 Hz). Preferably linkages 32 include rod ends 34 on both ends of the longitudinal strut rod, preferably with the system needing a Xlbs./inch stiffness for the linkage, the two rod ends 34 with twice the stiffness 2Xlbs./inch stiffness are utilized to provide beneficial elastomer life performance and decreased post fire deflections for the linkage, such as for a linkage system need of 20,000 lbs./inch stiffness, 40,000 lbs./inch rod ends are used on both ends (two with twice the stiffness). As shown in FIG. 2 these low spring rates are the radial spring rates for the rod end ($K_{radial}$), with the spring line of action 42 along the longitudinal length of the linkage 32, with the other spring rates of the rod end (axial, cocking, torsional) are even lower, preferably an order of magnitude lower than the radial spring rate, preferably <50,000, preferably <20,000, preferably <10,000, preferably <5,000 lbs./inch. Such as shown in FIG. 11-14, linkages 32 with rod ends 34 preferably have low dynamic force transfer functions at the auxiliary power unit operation frequencies, preferably at both the low end generator frequency of about 176 Hz and the low end turbine frequency of about 517 Hz. For a linkage 32 with a single rod ends 34 preferably the low dynamic force transfer functions are <15%. For linkages 32 with rod ends 34 on both ends of the linkage preferably the low dynamic force transfer functions are <3%, preferably <2%.

The rod end elastomer is formed from an elastomeric rubber material such as natural rubber, polyisoprene, polybutadiene, isobutylene-isoprene, ethylene-propylene, and silicone. Preferably the rod end intermediate elastomer 40 is a high temperature silicone. For linkages 32 with rod ends 34 on both ends of the linkage preferably the intermediate elastomer 40 is a high temperature silicone for both the inboard and outboard rod ends 34. Preferably the rod end intermediate elastomer 40 is a temperature resistant and drift and set resistant silicone elastomer, preferably comprised of a siloxane, preferably comprised of polysiloxanes, and most preferably comprised of polydimethylsiloxane. Preferably the rod end intermediate elastomer 40 is a heat curable silicone elastomer cured (vulcanized) at a temperature above room temperature. A high temperature curable silicone (Q) elastomer is preferred. The silicone elastomer is preferably polydimethylsiloxane (MQ) polymerized with small amounts of a vinyl containing siloxane (VMQ) for cure sites. The silicone rubber may be copolymerized with diphenylsiloxane or phenylmethylsiloxane, with or without vinyl cure sites (PMQ or PVMQ).

The silicone elastomer may be peroxide cured, but they may also be cured with other curing mechanisms such as a platinum catalyzed addition cure.

Preferably the rod ends 34 are comprised of concentric tubes, with the outer member, the elastomer, and the inner member center bore axis aligned and coincident, preferably with the aligned center bore axis nonparallel normal to the linkage longitudinal length and line of action 42. Preferably the bore axis 66,68 are not parallel or collinear with the linkage 32. Preferably such alignment orientation is maintained by attachment of the rod end to linkage rod, with a robust attachment mechanism such as by welding, crimping, or threaded attachments. Preferably the linkage rod 32 is a tube.

The invention includes the method of making the aircraft auxiliary power unit suspension system 20 for isolating the aircraft auxiliary power unit 22 having the center of gravity 24 and the at least one aircraft auxiliary power unit operation frequency. Preferably the aircraft auxiliary power unit suspension system 20 is made as a focalized aircraft auxiliary power unit suspension system 20, preferably at least partially focalized with an at least partially focalized APU center of gravity. The method includes providing a first rigid longitudinal rod suspension linkage 32 terminating with a first suspension linkage first low stiffness elastomeric resilient rod end 34, the first suspension linkage first low stiffness rod end having a low spring rate. The method includes providing a second rigid longitudinal rod suspension linkage 32, the second suspension linkage terminating with a second suspension linkage first low stiffness resilient rod end 34, the second suspension linkage first low stiffness rod end 34 having a low spring rate. The first suspension linkage first low stiffness rod end low spring rate and the second suspension linkage first low stiffness rod end low spring rate provide isolation of the aircraft auxiliary power unit 22 with the aircraft auxiliary power unit having a suspended auxiliary power unit natural frequency below the aircraft auxiliary power unit operation frequency. Preferably the suspended auxiliary power unit natural frequency is above a lower frequency limit, with the lower frequency being the main engine windmilling excitation frequency. Preferably the aircraft auxiliary power unit suspension system provides a suspended auxiliary power unit natural frequency with a natural frequency band upper limit below the aircraft auxiliary power unit operation frequency and a natural frequency band lower limit above main engine windmilling excitation frequency. Preferably the natural frequency band lower limit is above about 5-20 Hz, more preferably above 9 to 20 Hz, and more preferably above 20 Hz. Preferably the first rigid longitudinal rod suspension linkage terminates with a distal first suspension linkage second low stiffness resilient rod end 34, and the second rigid longitudinal rod suspension linkage 32 terminates with a distal second suspension linkage second low stiffness resilient rod end 34. Preferably the first rigid longitudinal rod suspension linkage has a elastomeric resilient spring line of action running along the longitudinal length of the first rigid longitudinal rod suspension linkage and through the first rigid longitudinal rod suspension linkage first low stiffness rod end, the second rigid longitudinal rod suspension linkage has a elastomeric resilient spring line of action running along the longitudinal length of the second rigid longitudinal rod suspension linkage and through the second rigid longitudinal rod suspension linkage first low stiffness rod end, wherein the first rigid longitudinal rod suspension linkage resilient spring line of action intersects the second rigid longitudinal rod suspension linkage resilient spring line of action proximate the aircraft auxiliary power unit center of gravity. Preferably the system 20 is at least partially focalized, with the suspension linkages having an elastomeric spring line of action running along the longitudinal length of the linkage and through the rod end, wherein the elastomeric spring lines of action intersect at a focal elastic center axis, with the focal elastic center axis proximate the APU center of gravity (3 planes intersect proximate center of gravity for fully focalized, two thirds partially focalized with 2 planes, one third partially focalized with only one plane). Preferably the APU hangs from the structural surfaces of the aircraft on the suspension linkages, preferably the majority of the center of gravity weight is supported from above and sides by the linkages, as contrasted with being supported from the bottom below the center of gravity such as with mounts between the APU bottom and aircraft floor. Preferably the APU hung from the firewall and ceiling of the aircraft with the long longitudinal linkage struts mainly under tension, not under compression. Preferably at least two of the linkages are above the center of gravity, preferably the majority are above the center of gravity, not below the center of gravity. Preferably the rod end includes a rigid nonextensible outer member, a rigid nonextensible inner member, and an intermediate elastomer between the rigid nonextensible outer member and the rigid nonextensible inner member, the intermediate elastomer bonded to the rigid nonextensible inner member. Preferably the rigid nonextensible inner member has an outer bonding surface with the intermediate elastomer bonded to the rigid nonextensible inner member outer bonding surface. Preferably the rigid nonextensible inner member outer bonding surface is comprised of a cylindrical shell surface. Preferably the rigid nonextensible inner member comprises a cylindrical tubular inner member. Preferably the rigid nonextensible inner member comprises a cylindrical tubular inner member having a cylindrical tubular center bore with a center bore axis. Preferably the rigid nonextensible inner member comprises a cylindrical tubular inner member having a cylindrical tubular center bore with a center bore axis, and the rigid nonextensible outer member having a cylindrical tubular center bore with an inner surface, the rigid outer member center bore having a center axis, wherein the intermediate elastomer and the rigid nonextensible inner member are received in the rigid outer member center bore with the rigid nonextensible inner member center bore axis aligned with the rigid outer member center bore center axis. Preferably the rigid nonextensible outer member has a cylindrical center bore with an inner cylindrical bore surface, wherein the intermediate elastomer has an unbonded outer surface distal from the rigid inner member outer bonding surface, the intermediate elastomer unbonded outer surface engaging the rigid outer member inner cylindrical bore surface. Preferably the unbonded elastomer surface frictionally engages the rigid outer member inner cylindrical bore surface, preferably with the rigid inner member and bonded elastomer are pressfit into the bore, with the unbonded elastomer outer surface having a diameter greater than the inner cylindrical bore surface of the rigid nonextensible outer member, preferably with the unbonded elastomer surface unlubricated. Preferably lubrication of the unbonded elastomer surface interface with the inner cylindrical bore surface of the rigid outer member is inhibited to ensure frictional engagement. Preferably the intermediate elastomer is molded with outboard flanges, such elastomeric lips that have an unbonded OD that is greater than the unbonded elastomer OD outer surface that is engaging the rigid outer member inner cylindrical bore surface, with elastomeric flange OD greater than the rigid outer member inner cylindrical bore surface ID. Preferably the intermediate elastomer 40 has an intermediate elastomer thickness between the inner rigid member 38 and outer rigid member 36 that is greater than 0.05 inches (1.27 mm), preferably at least 0.06 inches (1.52 mm), and preferably at least 2 mm to give the rod end 34 the low spring rate. Preferably intermediate elastomer thickness is at least 0.1 inches (2.54 mm) to give the low spring rate, such as about 0.166 inches (4.2 mm). Preferably the rod end 34 low spring rate is less than 500,000 lbs./inch (87,000N/mm), preferably with a static shear modulus less than 250 psi. Preferably the rod end 34 low spring rate is less than 500,000 lbs./inch, preferably <300,000 lbs./inch, preferably <250,000 lbs./inch, preferably <200,000 lbs./inch, preferably <100,000 lbs./inch, preferably <50,000 lbs./inch. Preferably the rod end 34 low spring rate is in the range from 20,000 to 100,000 lbs./inch, preferably in the range from 20,000 to 50,000 lbs./inch. Preferably the rod end low spring rate is provided by the elastomer thickness in proportion to the load area to produce a low shape factor part, with a shape factor of 0.25 to 5, with the elastomer shape factor giving the low spring rate. Preferably the no greater than 50,000 lbs/inch rod ends 34 provide the aircraft auxiliary power unit suspension system 20 with a suspended auxiliary power unit natural frequency below the about 200 Hz APU generator frequency (200±50 Hz, preferably 200±25 Hz, such as about 175 Hz) and below the about 500 Hz APU turbine frequency (500±50, preferably 500±25 Hz, such as about 520 Hz). Preferably linkages 32 include rod ends 34 on both ends of the longitudinal strut rod, preferably with the system needing a Xlbs./inch stiffness for the linkage, the two rod ends 34 with twice the stiffness 2Xlbs./inch stiffness are utilized to provide beneficial elastomer life performance and decreased post fire deflections for the linkage, such as for a linkage system need of 20,000 lbs./inch stiffness, 40,000 lbs./inch rod ends are used on both ends (two with twice the stiffness). As shown in FIG. 2 these low spring rates are the radial spring rates for the rod end ($K_{radial}$), with the spring line of action 42 along the longitudinal length of the linkage 32, with the other spring rates of the rod end (axial, cocking, torsional) are even lower, preferably an order of magnitude lower than the radial spring rate, preferably <50,000, preferably <20,000, preferably <10,000, preferably <5,000 lbs./inch. Such as shown in FIG. 11-14, linkages 32 with rod ends 34 preferably have low dynamic force transfer functions at the auxiliary power unit operation frequencies, preferably at both the low end generator frequency of about 176 Hz and the low end turbine frequency of about 517 Hz. For a linkage 32 with a single rod ends 34 preferably the low dynamic force transfer functions are <15%. For linkages 32 with rod ends 34 on both ends of the linkage preferably the low dynamic force transfer functions are <3%, preferably <2%. The rod end elastomer is formed from an elastomeric rubber material such as natural rubber, polyisoprene, polybutadiene, isobutylene-isoprene, ethylene-propylene, and silicone. Preferably the rod end intermediate elastomer 40 is a high temperature silicone. For linkages 32 with rod ends 34 on both ends of the linkage preferably the intermediate elastomer 40 is a high temperature silicone for both the inboard and outboard rod ends 34. Preferably the rod end intermediate elastomer 40 is a temperature resistant and drift and set resistant silicone elastomer, preferably comprised of a siloxane, preferably comprised of polysiloxanes, and most preferably comprised of polydimethylsiloxane. Preferably the rod end intermediate elastomer 40 is a heat curable silicone elastomer cured (vulcanized) at a temperature above room temperature. A high temperature curable silicone (Q) elastomer is preferred. The silicone elastomer is preferably polydimethylsiloxane (MQ) polymerized with small amounts of a vinyl containing siloxane (VMQ) for cure sites. The silicone rubber may be copolymerized with diphenylsiloxane or phenylmethylsiloxane, with or without vinyl cure sites (PMQ or PVMQ). The silicone elastomer may be peroxide cured, but they may also be cured with other curing mechanisms such as a platinum catalyzed addition cure. Preferably the rod ends 34 are comprised of concentric tubes, with the outer member, the elastomer, and the inner member center bore axis aligned and coincident, preferably with the aligned center bore axis nonparallel normal to the linkage longitudinal length and line of action 42. Preferably the bore axis 66,68 are not parallel or collinear with the linkage 32. Preferably such alignment orientation is maintained by attachment of the rod end to linkage rod, with a robust attachment mechanism such as by welding, crimping, or threaded attachments. Preferably the linkage rod 32 is a tube.

The invention includes the method of making the aircraft auxiliary power unit suspension system linkage for isolating the aircraft auxiliary power unit 22 having the at least one aircraft auxiliary power unit operation frequency. The method includes providing a first auxiliary power unit rigid longitudinal rod suspension linkage having a longitudinal length, providing a first auxiliary power unit suspension linkage first low stiffness resilient rod end, the first auxiliary power unit suspension linkage first low stiffness rod end having a low spring rate, and attaching the first auxiliary power unit suspension linkage first low stiffness resilient rod end to a first end of the first rigid longitudinal rod suspension linkage to provide an aircraft auxiliary power unit suspension system linkage with a resilient spring line of action running along the longitudinal length of the longitudinal rod and through the first rigid longitudinal rod suspension linkage first low stiffness rod end. The method including providing a distal first suspension linkage second low stiffness rod end, the distal first suspension linkage second low stiffness rod end having a low spring rate, and attaching the distal first suspension linkage second low stiffness rod end to a second end of the first rigid longitudinal rod suspension linkage distal from the first end of the first rigid longitudinal rod suspension linkage. Preferably attaching the first auxiliary power unit suspension linkage first low stiffness resilient rod end to the first rigid longitudinal rod suspension linkage includes aligning the first auxiliary power unit suspension linkage first low stiffness resilient rod end with the first auxiliary power unit rigid longitudinal rod suspension linkage longitudinal length to provide a resilient spring line of action running along the longitudinal length of the first rigid longitudinal rod suspension linkage and through the first rigid longitudinal rod suspension linkage first low stiffness rod end. Preferably the rod end includes a rigid nonextensible outer member, a rigid nonextensible inner member, and an intermediate elastomer between the rigid nonextensible outer member and the rigid nonextensible inner member, the intermediate elastomer bonded to the rigid nonextensible inner member. Preferably the rigid nonextensible inner member has an outer bonding surface with the intermediate elastomer bonded to the rigid nonextensible inner member outer bonding surface. Preferably the rigid nonextensible inner member outer bonding surface is comprised of a cylindrical shell surface. Preferably the rigid nonextensible inner member comprises a cylindrical tubular inner member. Preferably the rigid nonextensible inner member comprises a cylindrical tubular inner member having a cylindrical tubular center bore with a center bore axis. Preferably the rigid nonextensible inner member comprises a cylindrical tubular inner member having a cylindrical tubular center bore with a center bore axis, and the rigid nonextensible outer member having a cylindrical tubular center bore with an inner surface, the rigid outer member center bore having a center axis, wherein the intermediate elastomer and the rigid nonextensible inner member are received in the rigid outer member center bore with the rigid nonextensible inner member center bore axis aligned with the rigid outer member center bore center axis. Preferably the rigid nonextensible outer member has a cylindrical center bore with an inner cylindrical bore surface, wherein the intermediate elastomer has an unbonded outer surface distal from the rigid inner member outer bonding surface, the intermediate elastomer unbonded outer surface engaging the rigid outer member inner cylindrical bore surface. Preferably the unbonded elastomer surface frictionally engaging the rigid outer member inner cylindrical bore surface, preferably the rigid inner member and bonded elastomer are pressfit into the bore, unbonded elastomer outer surface having diameter greater than the inner cylindrical bore surface of the rigid nonextensible outer member, preferably the unbonded elastomer surface is unlubricated, lubrication of the unbonded elastomer surface interface with the inner cylindrical bore surface of the rigid outer member inhibited to ensure frictional engagement. Preferably the intermediate elastomer is molded with outboard flanges, such elastomeric lips that have an unbonded OD that is greater than the unbonded elastomer OD outer surface that is engaging the rigid outer member inner cylindrical bore surface, with elastomeric flange OD greater than the rigid outer member inner cylindrical bore surface ID. Preferably the intermediate elastomer 40 has an intermediate elastomer thickness between the inner rigid member 38 and outer rigid member 36 that is greater than 0.05 inches (1.27 mm), preferably at least 0.06 inches (1.52 mm), and preferably at least 2 mm to give the rod end 34 the low spring rate. Preferably intermediate elastomer thickness is at least 0.1 inches (2.54 mm) to give the low spring rate, such as about 0.166 inches (4.2 mm). Preferably the rod end 34 low spring rate is less than 500,000 lbs./inch (87,000N/mm), preferably with a static shear modulus less than 250 psi. Preferably the rod end 34 low spring rate is less than 500,000 lbs./inch, preferably <300,000 lbs./inch, preferably <250,000 lbs./inch, preferably <200,000 lbs/inch, preferably <100,000 lbs./inch, preferably <50,000 lbs./inch. Preferably the rod end 34 low spring rate is in the range from 20,000 to 100,000 lbs./inch, preferably in the range from 20,000 to 50,000 lbs./inch. Preferably the rod end low spring rate is provided by the elastomer thickness in proportion to the load area to produce a low shape factor part, with a shape factor of 0.25 to 5, with the elastomer shape factor giving the low spring rate. Preferably the no greater than 50,000 lbs/inch rod ends 34 provide the aircraft auxiliary power unit suspension system 20 with a suspended auxiliary power unit natural frequency below the about 200 Hz APU generator frequency (200±50 Hz, preferably 200±25 Hz, such as about 175 Hz) and below the about 500 Hz APU turbine frequency (500±50, preferably 500±25 Hz, such as about 520 Hz). Preferably linkages 32 include rod ends 34 on both ends of the longitudinal strut rod, preferably with the system needing a Xlbs./inch stiffness for the linkage, the two rod ends 34 with twice the stiffness 2Xlbs./inch stiffness are utilized to provide beneficial elastomer life performance and decreased post fire deflections for the linkage, such as for a linkage system need of 20,000 lbs./inch stiffness, 40,000 lbs./inch rod ends are used on both ends (two with twice the stiffness). As shown in FIG. 2 these low spring rates are the radial spring rates for the rod end (K with the spring line of action 42 along the longitudinal length of the linkage 32, with the other spring rates of the rod end (axial, cocking, torsional) are even lower, preferably an order of magnitude lower than the radial spring rate, preferably <50,000, preferably <20,000, preferably <10,000, preferably <5,000 lbs./inch. Such as shown in FIG. 11-14, linkages 32 with rod ends 34 preferably have low dynamic force transfer functions at the auxiliary power unit operation frequencies, preferably at both the low end generator frequency of about 176 Hz and the low end turbine frequency of about 517 Hz. For a linkage 32 with a single rod ends 34 preferably the low dynamic force transfer functions are <15%. For linkages 32 with rod ends 34 on both ends of the linkage preferably the low dynamic force transfer functions are <3%, preferably <2%. The rod end elastomer is formed from an elastomeric rubber material such as natural rubber, polyisoprene, polybutadiene, isobutylene-isoprene, ethylene-propylene, and silicone. Preferably the rod end intermediate elastomer 40 is a high temperature silicone. For linkages 32 with rod ends 34 on both ends of the linkage preferably the intermediate elastomer 40 is a high temperature silicone for both the inboard and outboard rod ends 34. Preferably the rod end intermediate elastomer 40 is a temperature resistant and drift and set resistant silicone elastomer, preferably comprised of a siloxane, preferably comprised of polysiloxanes, and most preferably comprised of polydimethylsiloxane. Preferably the rod end intermediate elastomer 40 is a heat curable silicone elastomer cured (vulcanized) at a temperature above room temperature. A high temperature curable silicone (Q) elastomer is preferred. The silicone elastomer is preferably polydimethylsiloxane (MQ) polymerized with small amounts of a vinyl containing siloxane (VMQ) for cure sites. The silicone rubber may be copolymerized with diphenylsiloxane or phenylmethylsiloxane, with or without vinyl cure sites (PMQ or PVMQ). The silicone elastomer may be peroxide cured, but they may also be cured with other curing mechanisms such as a platinum catalyzed addition cure. Preferably the rod ends 34 are comprised of concentric tubes, with the outer member, the elastomer, and the inner member center bore axis aligned and coincident, preferably with the aligned center bore axis nonparallel normal to the linkage longitudinal length and line of action 42. Preferably the bore axis 66,68 are not parallel or collinear with the linkage 32. Preferably such alignment orientation is maintained by attachment of the rod end to linkage rod, with a robust attachment mechanism such as by welding, crimping, or threaded attachments. Preferably the linkage rod 32 is a tube.

Figure 1A:
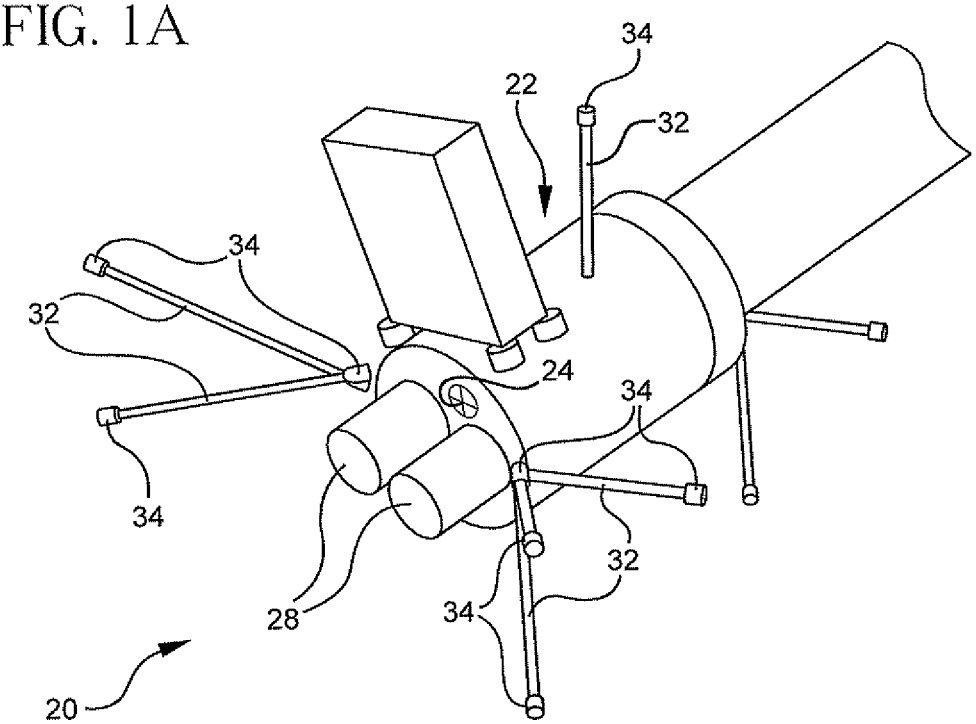
FIG. 1A-D shows aircraft auxiliary power unit (APU) suspension systems.
Figure 1B:
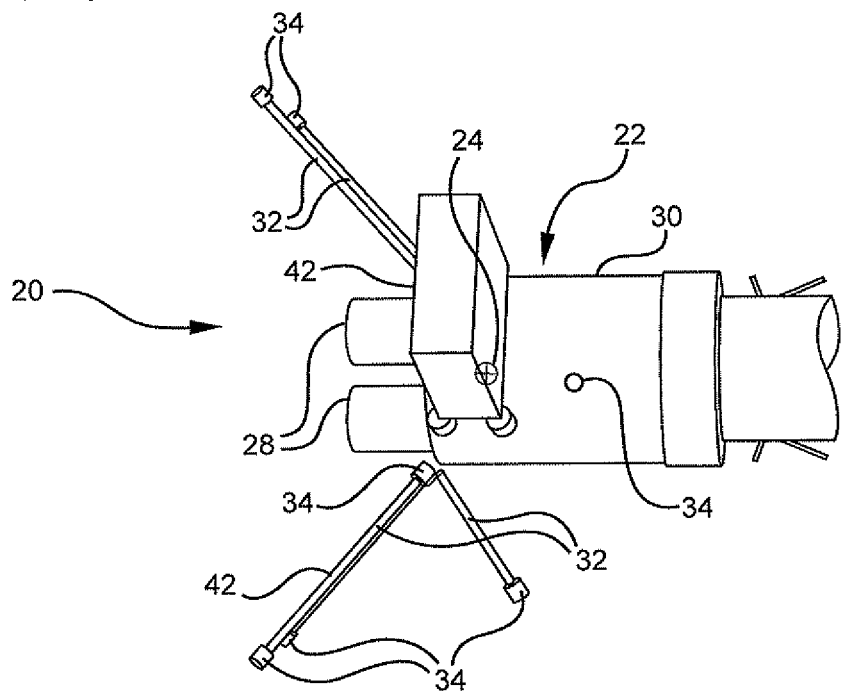
Figure 1C:
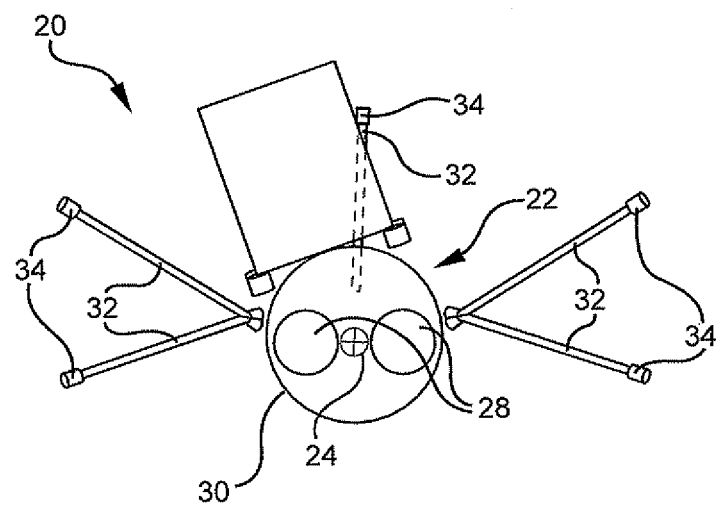
Figure 1D:
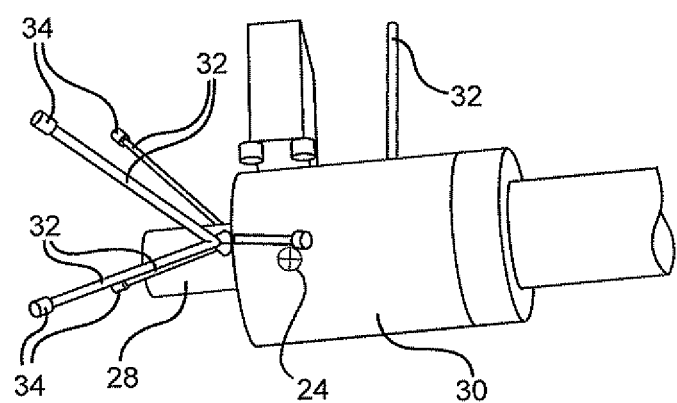
Figure 7A:
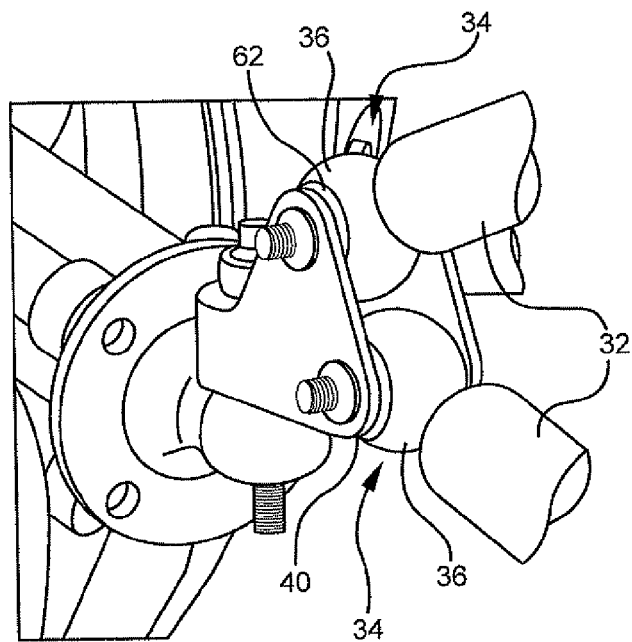
FIG. 7A-B shows an APU rod end suspension system.
Figure 7B:
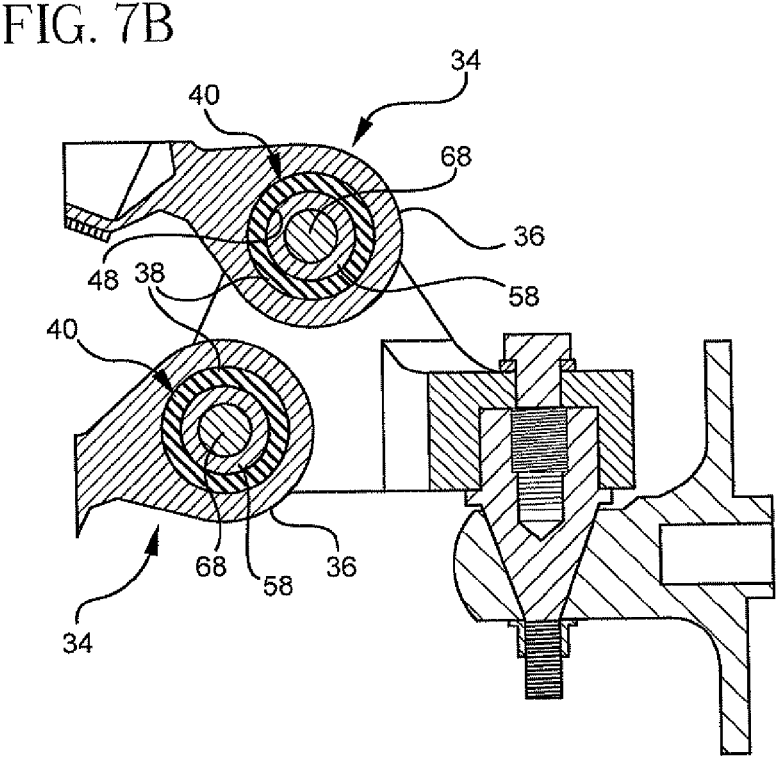
Figure 8A:
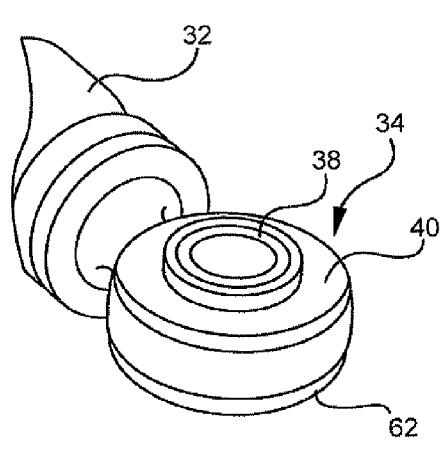
FIG. 8A-D shows APU suspension system rod ends.
Figure 8B:
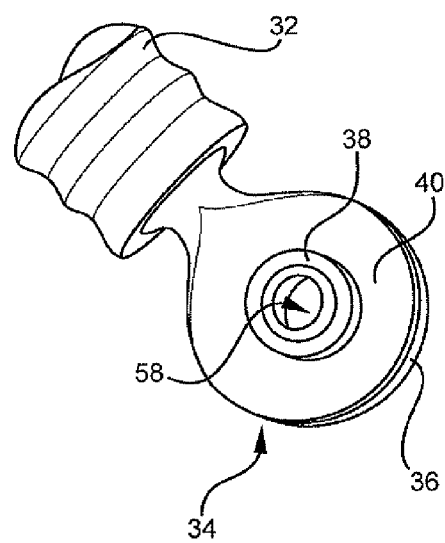
Figure 8C:
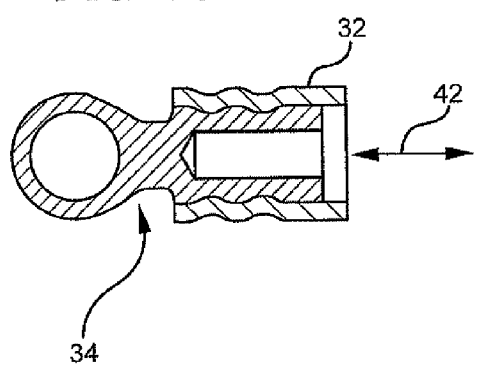
Figure 8D:
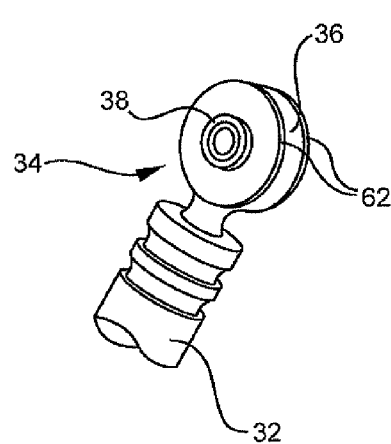
Figure 9:
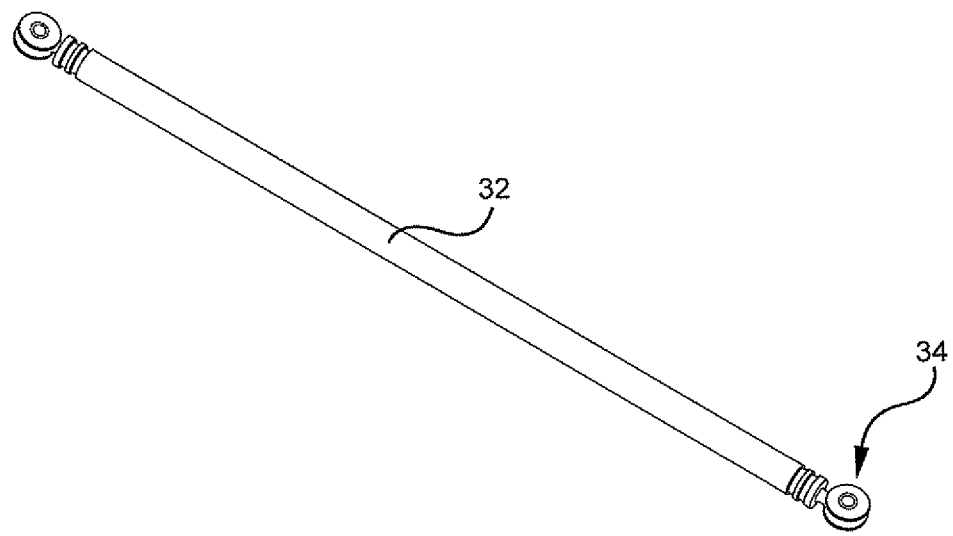
FIG. 9 shows an APU suspension system rod end linkage.
Figure 10:
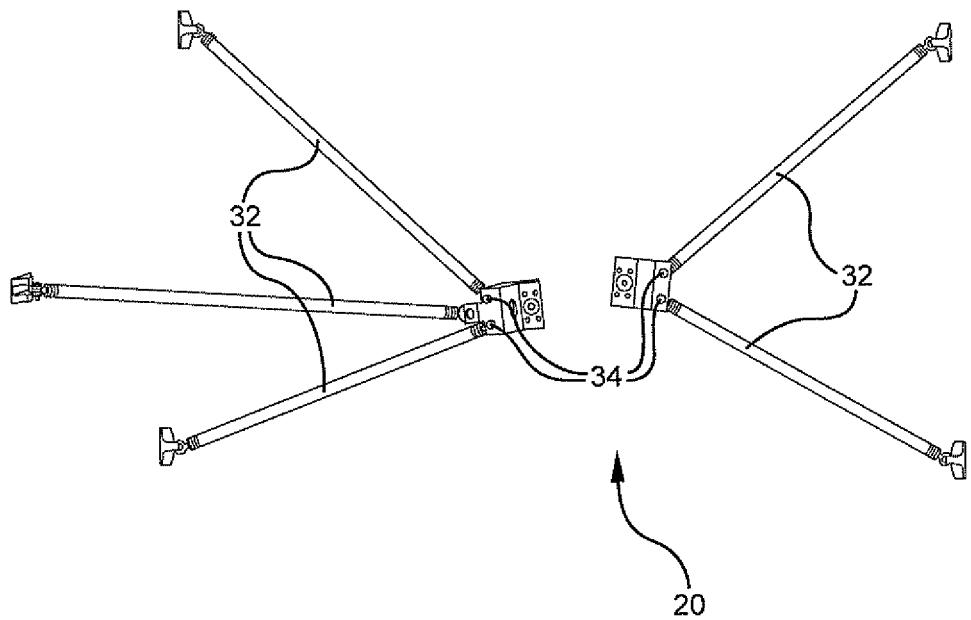
FIG. 10 shows an APU rod end suspension system.
Figure 11:
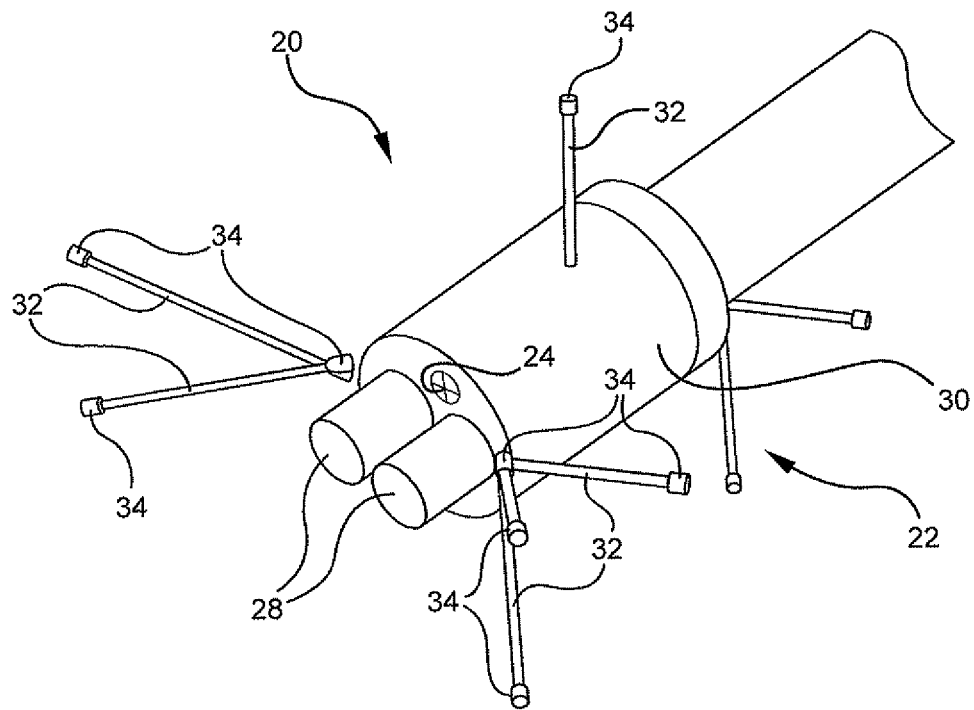
FIG. 11 shows an APU rod end suspension system.
Figure 12:
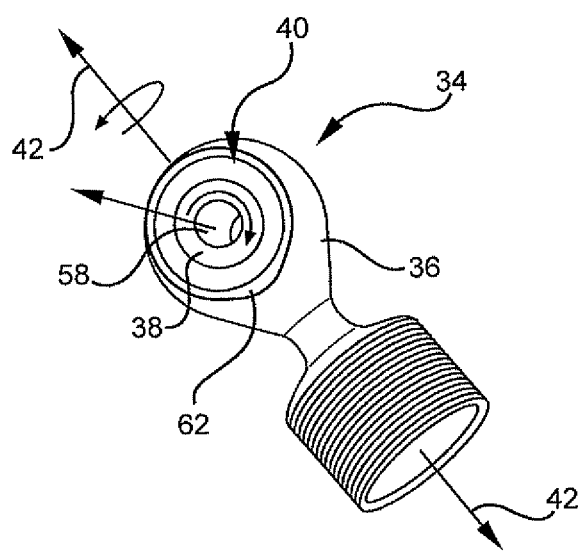
FIG. 12 shows an APU suspension system rod end.
Figure 15A:
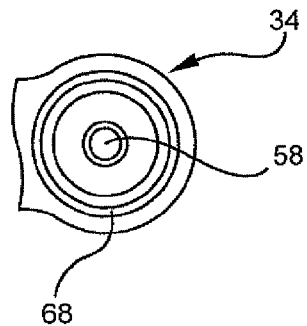
FIGS. 15A-B shows an APU suspension system rod end.
Figure 15B:
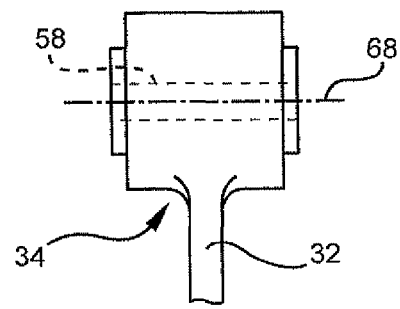
Figure 16A:
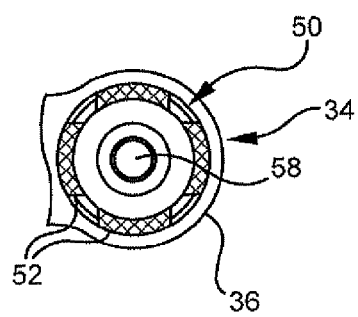
FIGS. 16A-E shows an APU suspension system rod end.
Figure 16B:
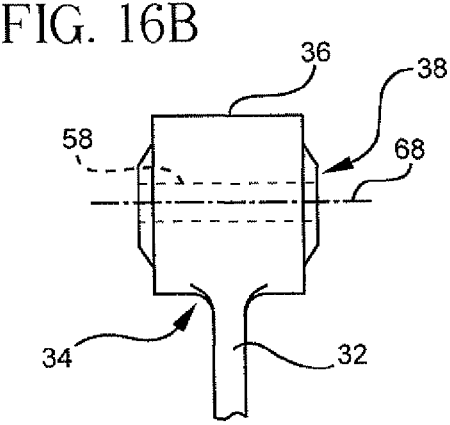
Figure 16C:
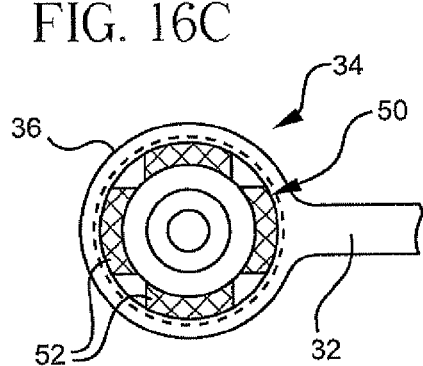
Figure 16D:
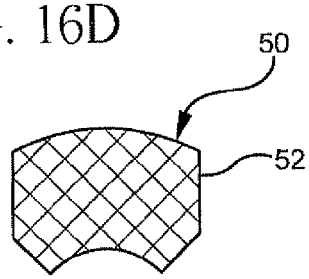
Figure 16E:
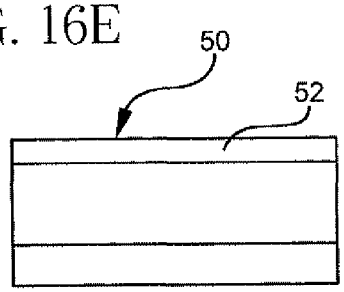
Figure 17:
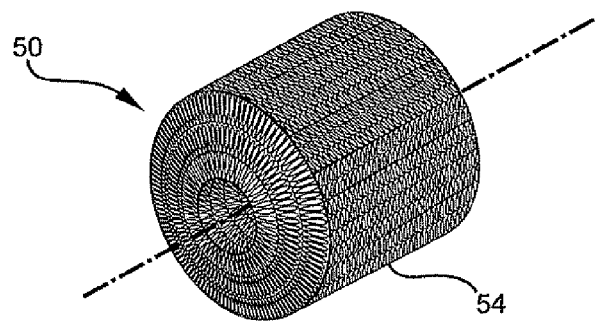
FIG. 17 shows a metal mesh.

The invention includes the aircraft auxiliary power unit suspension system 20 for isolating the aircraft auxiliary power unit 22 having the center of gravity 24 and the at least one aircraft auxiliary power unit operation frequency, preferably with the center of gravity focalized. Preferably the aircraft auxiliary power unit suspension system is comprised of the least one rigid longitudinal suspension linkage 32, the suspension linkage terminating with a first low stiffness resilient rod end 34, wherein the low stiffness resilient rod end 34 has a low spring rate wherein the aircraft auxiliary power unit suspension system 20 provides the aircraft auxiliary power unit 22 with a suspended auxiliary power unit natural frequency below the aircraft auxiliary power unit operation frequency. Preferably the aircraft auxiliary power unit suspension system 20 is a focalized system. In an embodiment the aircraft auxiliary power unit suspension system is partially focalized. In an embodiment the aircraft auxiliary power unit suspension system is a fully focalized system. Preferably the aircraft auxiliary power unit suspension system 20 isolates an aircraft auxiliary power unit 22 with a first low operation frequency of a generator 28, and a second high operation frequency of a turbine 30. Preferably with the first low operation frequency is the generator operation frequency and the second high operation frequency is the turbine operation frequency. The aircraft auxiliary power unit suspension system 20 is comprised of at least one rigid longitudinal suspension linkage 32, the suspension linkage terminating with a first low stiffness rod end 34, wherein the low stiffness rod end 34 has a low spring rate wherein the aircraft auxiliary power unit suspension system 20 provides the aircraft auxiliary power unit 22 with a suspended auxiliary power unit natural frequency, the suspended auxiliary power unit natural frequency below the aircraft auxiliary power unit operation frequency. Preferably the suspended auxiliary power unit natural frequency is above a lower frequency limit, with the lower frequency being the main engine windmilling excitation frequency of the aircraft. Preferably the aircraft auxiliary power unit suspension system provides a suspended auxiliary power unit natural frequency with a natural frequency band upper limit below the aircraft auxiliary power unit operation frequency and a natural frequency band lower limit above main engine windmilling excitation frequency. Preferably the natural frequency band lower limit is above about 5-20 Hz, more preferably above 9 to 20 Hz, and more preferably above 20 Hz. Preferably the suspension linkage terminates with a distal second low stiffness resilient rod end, wherein the first low stiffness resilient rod end and the distal second low stiffness resilient rod end in series provide the suspended auxiliary power unit natural frequency below the aircraft auxiliary power unit operation frequency. Preferably the rod end includes a rigid nonextensible outer member, a rigid nonextensible inner member, and an intermediate extensible resilient spring material between the rigid nonextensible outer member and the rigid nonextensible inner member, the extensible resilient spring material having a resilient spring material low spring rate less than 500,000 lbs./inch (87,000N/mm). Preferably the intermediate extensible resilient spring material is comprised of an elastomer. In preferred alternative embodiments such as shown in FIG. 16-17 the intermediate extensible resilient spring material is comprised of a metal mesh 50, preferably a metallic wire mesh matrix that supports the rod end loads and accommodates motions between the inner and outer member, preferably a drawn metallic wire extending in random relationship to each other, preferably including helical coils, with the coils containing wires compacted and compressed. In a preferred embodiment such as shown in FIG. 16 the resilient spring material metal mesh 50 is comprised of a plurality of metal mesh extensible arch members 52 which encompass the rigid nonextensible inner member. In a preferred embodiment such as shown in FIG. 17 the resilient spring material metal mesh 50 is comprised of a metal mesh extensible tube member 54 which has a center bore and encompass the rigid nonextensible inner member. Preferably the rigid nonextensible inner member outer surface is comprised of a cylindrical shell surface. Preferably the rigid nonextensible inner member comprises a cylindrical tubular inner member. Preferably the rigid nonextensible inner member comprises a cylindrical tubular inner member having a cylindrical tubular center bore with a center bore axis. Preferably the rigid nonextensible inner member comprises a cylindrical tubular inner member having a cylindrical tubular center bore with a center bore axis, and the rigid nonextensible outer member having a cylindrical tubular center bore with an inner surface, the rigid outer member center bore having a center axis, wherein the intermediate extensible resilient spring material and the rigid nonextensible inner member are received in the rigid outer member center bore with the rigid nonextensible inner member center bore axis aligned with the rigid outer member center bore center axis. Preferably the rod end low spring rate is less than 500,000 lbs./inch, preferably <300,000 lbs./inch, preferably <250,000 lbs./inch, preferably <200,000 lbs./inch, preferably <100,000 lbs./inch, preferably <50,000 lbs./inch. Preferably the rod end low spring rate is in the range from 20,000 to 100,000 lbs./inch, preferably in the range from 20,000 to 50,000 lbs./inch. Preferably the linkages 32 with rod ends 34 have low dynamic force transfer functions at the low end generator frequency (about 176 Hz) and the low end turbine frequency (about 517 Hz), preferably for single rod end linkages <15%, preferably for rod ends on both ends of linkage <3%, preferably <2%. Preferably the rod ends are comprised of concentric tubes, outer member, resilient spring material, inner member, with the center bore axis aligned and coincident, preferably with the center bore axis nonparallel and normal to the linkage longitudinal length and line of action, with the bore axis not parallel or collinear with the linkage.

Preferably the invention includes the aircraft auxiliary power unit suspension system utilizing a tuned vibration absorber TVA (Tuned Vibration Absorber) with a vibration absorbing mass 72 and a vibration absorbing spring 74 such as shown in FIG. 21-24. Preferably the aircraft auxiliary power unit suspension system includes a vibration absorbing mass 72 and a vibration absorbing spring 74 wherein the vibration absorbing mass is attached to the suspension linkage 32 with the vibration absorbing spring, with the vibration absorbing mass resonating on the vibration absorbing spring as a TVA (Tuned Vibration Absorber) at a predetermined problematic tuned frequency. In an embodiment the vibration absorbing mass 72 is inside the linkage. In an embodiment the vibration absorbing mass 72 is on the outside of the linkage. Relative to the linkage 32, the mass 72 can be proximate to either the inboard or outboard end of linkage or at both ends. Although the mass 72 and spring 74 are locatable along the length of the linkage, in preferred embodiments they are located proximate the ends. In the embodiments with the vibration absorbing mass 72 and the vibration absorbing spring 74 only working along the primary long axis of the linkage (along the line of action 42), preferably the location is proximate the ends or along the linkage between the ends. In embodiments of a multi-directional TVA (axial and nonaxial, radial), preferably the location along the linkage is at the node point of the linkage for the desired flexing (bending) mode which the spring and mass is to damp. Preferably with a two axis TVA the axial mode (linkage length) and the first bending mode of the linkage (linkage flexing), the TVA is located at the midspan between the rod ends, with the midspan at the node of the first bending (beaming) mode of the linkage. Preferably there is a strong relationship between the TVA predetermined problematic tuned frequency and said suspended auxiliary power unit natural frequency(s), the aircraft auxiliary power unit operation frequency, or the operational frequencies of key APU subsystems (generators, pumps, etc.), and the aircraft induced driving frequencies from normal flight, frame modes or a-typical operation such as main engine, post fan blade out wind milling operations. Preferably there is a relationship between the vibration absorbing spring's spring rate and said low stiffness elastomeric rod end has a low spring rate s to ensure multi-mass tuning is either intentionally avoided or intentionally used for improved performance. In an embodiment the linkage mass itself is the TVA mass between each rod end spring with no secondary mass 72 or spring 74 required to utilize the linkage 32 mass as the TVA. In the preferred embodiments the separate TVA vibration absorbing mass (72) and vibration absorbing spring (74) masses and spring rates are each tuned for their unique and independent functions.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents.

The invention claimed is:

1. An aircraft auxiliary power unit suspension system for isolating an aircraft auxiliary power unit having at least one aircraft auxiliary power unit operation frequency, said aircraft auxiliary power unit suspension system comprised of
at least one suspension linkage, said suspension linkage terminating with a first low stiffness elastomeric rod end, wherein said low stiffness elastomeric rod end has a low spring rate wherein said aircraft auxiliary power unit suspension system provides said aircraft auxiliary power unit with a suspended auxiliary power unit natural frequency, said suspended auxiliary power unit natural frequency below said aircraft auxiliary power unit operation frequency.

2. An aircraft auxiliary power unit suspension system as claimed in claim 1, wherein said suspension linkage terminates with a distal second low stiffness elastomeric rod end, wherein said first low stiffness elastomeric rod end and said distal second low stiffness elastomeric rod end in series provide said suspended auxiliary power unit natural frequency below said aircraft auxiliary power unit operation frequency.

3. An aircraft auxiliary power unit suspension system as claimed in claim 1, wherein said rod end includes a rigid outer member, a rigid inner member, and an intermediate elastomer between said rigid outer member and said rigid inner member, said intermediate elastomer bonded to said rigid inner member.

4. An aircraft auxiliary power unit suspension system as claimed in claim 3, wherein said rigid inner member has an outer bonding surface with said intermediate elastomer bonded to said rigid inner member outer bonding surface.

5. An aircraft auxiliary power unit suspension system as claimed in claim 4, wherein said rigid inner member outer bonding surface is comprised of a cylindrical shell surface.

6. An aircraft auxiliary power unit suspension system as claimed in claim 4, wherein said rigid inner member comprises a cylindrical tubular inner member.

7. An aircraft auxiliary power unit suspension system as claimed in claim 4, wherein said rigid inner member comprises a cylindrical tubular inner member having a center bore with a center bore axis.

8. An aircraft auxiliary power unit suspension system as claimed in claim 4, wherein said rigid inner member comprises a cylindrical tubular inner member having a center bore with a center bore axis, and said rigid outer member having a center bore with an inner surface, said rigid outer member center bore having a center axis, wherein said intermediate elastomer and said rigid inner member are received in said rigid outer member center bore with said rigid inner member center bore axis aligned with said rigid outer member center bore center axis.

9. An aircraft auxiliary power unit suspension system as claimed in claim 4, wherein said rigid outer member has a cylindrical center bore with an inner cylindrical bore surface, wherein said intermediate elastomer has an unbonded outer surface distal from said rigid inner member outer bonding surface, said intermediate elastomer unbonded outer surface engaging said rigid outer member inner cylindrical bore surface.

10. An aircraft auxiliary power unit suspension system as claimed in claim 1, including a vibration absorbing mass and a vibration absorbing spring, wherein said vibration absorbing mass is attached to said suspension linkage with said vibration absorbing spring.

11. A method of making a aircraft auxiliary power unit suspension system for isolating an aircraft auxiliary power unit having a center of gravity and at least one aircraft auxiliary power unit operation frequency, said method comprising:
providing a first suspension linkage, said first suspension linkage terminating with a first suspension linkage first low stiffness rod end, said first suspension linkage first low stiffness rod end having a low spring rate,
providing a second suspension linkage, said second suspension linkage terminating with a second suspension linkage first low stiffness rod end, said second suspension linkage first low stiffness rod end having a low spring rate, wherein said first suspension linkage first low stiffness rod end low spring rate and said second suspension linkage first low stiffness rod end low spring rate provide isolation of said aircraft auxiliary power unit with said aircraft auxiliary power unit having a suspended auxiliary power unit natural frequency, said suspended auxiliary power unit natural frequency below said aircraft auxiliary power unit operation frequency.

12. A method as claimed in claim 11, wherein said first suspension linkage terminates with a distal first suspension linkage second low stiffness rod end, and said second suspension linkage terminates with a distal second suspension linkage second low stiffness rod end.

13. A method as claimed in claim 11, said first suspension linkage having a resilient spring line of action running along the longitudinal length of the first suspension linkage and through the first suspension linkage first low stiffness rod end, said second suspension linkage having a resilient spring line of action running along the longitudinal length of the second suspension linkage and through the second suspension linkage first low stiffness rod end, wherein said first suspension linkage resilient spring line of action intersects said second suspension linkage resilient spring line of action proximate said aircraft auxiliary power unit center of gravity.

14. A method as claimed in claim 11, wherein said rod end includes a rigid outer member, a rigid inner member, and an intermediate elastomer between said rigid outer member and said rigid inner member, said intermediate elastomer bonded to said rigid inner member.

15. A method as claimed in claim 14, wherein said rigid inner member has an outer bonding surface with said intermediate elastomer bonded to said rigid inner member outer bonding surface.

16. A method as claimed in claim 14, wherein said rigid inner member outer bonding surface is comprised of a cylindrical shell surface.

17. A method as claimed in claim 14, wherein said rigid inner member comprises a cylindrical tubular inner member.

18. A method as claimed in claim 14, wherein said rigid inner member comprises a cylindrical tubular inner member having a center bore with a center bore axis.

19. A method as claimed in claim 14, wherein said rigid inner member comprises a cylindrical tubular inner member having a center bore with a center bore axis, and said rigid outer member having a center bore with an inner surface, said rigid outer member center bore having a center axis, wherein said intermediate elastomer and said rigid inner member are received in said rigid outer member center bore with said rigid inner member center bore axis aligned with said rigid outer member center bore center axis.

20. A method as claimed in claim 14, wherein said rigid outer member has a cylindrical center bore with an inner cylindrical bore surface, wherein said intermediate elastomer has an unbonded outer surface distal from said rigid inner member outer bonding surface, said intermediate elastomer unbonded outer surface engaging said rigid outer member inner cylindrical bore surface.

21. A method as claimed in claim 11 said method including providing a vibration absorbing mass and a vibration absorbing spring, attaching said vibration absorbing mass to said suspension linkage with said vibration absorbing spring.

22. A method of making an aircraft auxiliary power unit suspension system linkage for isolating an aircraft auxiliary power unit having at least one aircraft auxiliary power unit operation frequency, said method comprising:
providing a first auxiliary power unit rigid longitudinal rod suspension linkage having a longitudinal length,
providing a first auxiliary power unit suspension linkage first low stiffness rod end, said first auxiliary power unit suspension linkage first low stiffness rod end having a low spring rate, attaching said first auxiliary power unit suspension linkage first low stiffness rod end to a first end of said first suspension linkage to provide an aircraft auxiliary power unit suspension system linkage with a resilient spring line of action running along the longitudinal length of the longitudinal rod and through the first suspension linkage first low stiffness rod end.

23. A method as claimed in claim 22, said method including providing a distal first suspension linkage second low stiffness rod end, said distal first suspension linkage second low stiffness rod end having a low spring rate, and attaching said distal first suspension linkage second low stiffness rod end to a second end of said first suspension linkage distal from said first end of said first suspension linkage.

24. A method as claimed in claim 22, wherein attaching said first auxiliary power unit suspension linkage first low stiffness rod end to said first suspension linkage includes aligning said first auxiliary power unit suspension linkage first low stiffness rod end with said first auxiliary power unit rigid longitudinal rod suspension linkage longitudinal length to provide a resilient spring line of action running along the longitudinal length of the first suspension linkage and through the first suspension linkage first low stiffness rod end.

25. A method as claimed in claim 22, wherein said rod end includes a rigid outer member, a rigid inner member, and an intermediate elastomer between said rigid outer member and said rigid inner member, said intermediate elastomer bonded to said rigid inner member.

26. A method as claimed in claim 25, wherein said rigid inner member has an outer bonding surface with said intermediate elastomer bonded to said rigid inner member outer bonding surface.

27. A method as claimed in claim 25, wherein said rigid inner member outer bonding surface is comprised of a cylindrical shell surface.

28. A method as claimed in claim 25, wherein said rigid inner member comprises a cylindrical tubular inner member.

29. A method as claimed in claim 25, wherein said rigid inner member comprises a cylindrical tubular inner member having a center bore with a center bore axis.

30. A method as claimed in claim 25, wherein said rigid inner member comprises a cylindrical tubular inner member having a center bore with a center bore axis, and said rigid outer member having a center bore with an inner surface, said rigid outer member center bore having a center axis, wherein said intermediate elastomer and said rigid inner member are received in said rigid outer member center bore with said rigid inner member center bore axis aligned with said rigid outer member center bore center axis.

31. A method as claimed in claim 25, wherein said rigid outer member has a cylindrical center bore with an inner cylindrical bore surface, wherein said intermediate elastomer has an unbonded outer surface distal from said rigid inner member outer bonding surface, said intermediate elastomer unbonded outer surface engaging said rigid outer member inner cylindrical bore surface.

32. A method as claimed in claim 22 said method including providing a vibration absorbing mass and a vibration absorbing spring, attaching said vibration absorbing mass to said suspension linkage with said vibration absorbing spring.

33. An aircraft auxiliary power unit suspension system for isolating an aircraft auxiliary power unit having at least one aircraft auxiliary power unit operation frequency, said aircraft auxiliary power unit suspension system comprised of at least one suspension linkage, said suspension linkage terminating with a first low stiffness resilient rod end, wherein said low stiffness resilient rod end has a low spring rate wherein said aircraft auxiliary power unit suspension system provides said aircraft auxiliary power unit with a suspended auxiliary power unit natural frequency, said suspended auxiliary power unit natural frequency below said aircraft auxiliary power unit operation frequency.

34. An aircraft auxiliary power unit suspension system as claimed in claim 33, wherein said suspension linkage terminates with a distal second low stiffness resilient rod end, wherein said first low stiffness resilient rod end and said distal second low stiffness resilient rod end in series provide said suspended auxiliary power unit natural frequency below said aircraft auxiliary power unit operation frequency.

35. An aircraft auxiliary power unit suspension system as claimed in claim 33, wherein said rod end includes a rigid outer member, a rigid inner member, and an intermediate resilient spring material between said rigid outer member and said rigid inner member, said resilient spring material having a resilient spring material low spring rate less than 500,000 lbs./inch (87,000N/mm).

36. An aircraft auxiliary power unit suspension system as claimed in claim 35, wherein said intermediate resilient spring material is comprised of an elastomer.

37. An aircraft auxiliary power unit suspension system as claimed in claim 35, wherein said intermediate resilient spring material is comprised of a metal mesh.

38. An aircraft auxiliary power unit suspension system as claimed in claim 35, wherein said rigid inner member outer surface is comprised of a cylindrical shell surface.

39. An aircraft auxiliary power unit suspension system as claimed in claim 35, wherein said rigid inner member comprises a cylindrical tubular inner member.

40. An aircraft auxiliary power unit suspension system as claimed in claim 35, wherein said rigid inner member comprises a cylindrical tubular inner member having a center bore with a center bore axis.

41. An aircraft auxiliary power unit suspension system as claimed in claim 35, wherein said rigid inner member comprises a cylindrical tubular inner member having a center bore with a center bore axis, and said rigid outer member having a center bore with an inner surface, said rigid outer member center bore having a center axis, wherein said intermediate resilient spring material and said rigid inner member are received in said rigid outer member center bore with said rigid inner member center bore axis aligned with said rigid outer member center bore center axis.

42. An aircraft auxiliary power unit suspension system as claimed in claim 33, including a vibration absorbing mass and a vibration absorbing spring, wherein said vibration absorbing mass is attached to said suspension linkage with said vibration absorbing spring.

* * * * *